United States Patent Office 3,629,310
Patented Dec. 21, 1971

3,629,310
ORGANO-SILOXANE-OXYALKYLENE BLOCK COPOLYMERS
Donald L. Bailey, Sistersville, W. Va., and Francis M. O'Connor, Akron, Ohio, assignors to Union Carbide Corporation, New York, N.Y.
No Drawing. Continuation-in-part of application Ser. No. 162,980, Dec. 28, 1961, which is a continuation-in-part of applications Ser. No. 660,997, May 23, 1957, and Ser. No. 661,009, May 23, 1957. Ser. No. 660,997 is a continuation-in-part of application Ser. No. 417,935, Mar. 22, 1954, and Ser. No. 661,009 is a continuation-in-part of application Ser. No. 435,938, June 10, 1959.
This application Aug. 28, 1969, Ser. No. 853,931
Int. Cl. C07f 7/04, 7/18
U.S. Cl. 260—448.8 R         8 Claims

ABSTRACT OF THE DISCLOSURE

Organosiloxane-oxyalkylene block copolymers where the siloxane blocks are composed of difunctional and/or trifunctional Si atoms and the oxyalkylene blocks contain at least five oxyalkylene units and are derived from a triol are disclosed. The copolymers are useful as mold release agents, hydraulic fluids, lubricants, emulsifier, and surfactants.

CROSS-REFERENCES TO RELATED APPLICATIONS

This application is a continuation-in-part of application Ser. No. 162,980 filed Dec. 28, 1961, now U.S. Pat. 3,480,583 which in turn was continuation-in-part of application Ser. No. 660,997 filed May 23, 1957, now abandoned, and application Ser. No. 661,009, filed May 23, 1957, now abandoned. Said application Ser. No. 660,997 was a continuation-in-part of application Ser. No. 417,935, filed Mar. 22, 1954, now U.S. Pat. 2,834,748; and said application Ser. No. 661,009 was a continuation-in-part of application Ser. No. 435,938, filed June 10, 1954 now U.S. Pat 2,917,480.

This invention relates to organo-silicone compounds and to processes for making them. More particularly, it is concerned with organo-silicone compounds to which the name "block copolymer" is applied. In these block copolymers there are one or more blocks or sections to the molecule thereof which are silicone polymers (e.g. polydimethylsiloxy moieties) and one or more blocks or sections to the molecule thereof which are oxyalkylene polymers (e.g. polyoxyethylene moieties). The block copolymers of this invention are of two varieties, i.e. linear block copolymers and crosslinked block copolymers.

The linear block copolymers of this invention are particularly characterized as being linear polymers that are free of trifunctional silicon atoms (i.e. silicon atoms linked to three oxygen atoms and one carbon atom of a hydrocarbon group). In these linear block copolymers each siloxane block is linked at one end to an oxyalkylene block and at the other end to (1) another oxyalkylene block, (2) a trihydrocarbonsiloxy group, or (3) an alkoxy group while each oxyalkylene block is linked at one end to a siloxane block and at the other end to (1) another siloxane block, (2) a hydroxyl group or (3) a trihydrocarbonsiloxy group.

The crosslinked block copolymers of this invention are particularly characterized as being crosslinked polymers that contain at least one trifunctional silicon atom. The crosslinked block copolymers can have siloxane blocks that contain only trifunctional silicon atoms or they can have siloxane blocks that contain both trifunctional silicon atoms and difunctional silicon atoms (i.e. silicon atoms linked to the two oxygen atoms and two carbon atoms of hydrocarbon groups). The crosslinked copolymers having siloxane blocks that contain only trifunctional silicon atoms also have oxyalkylene blocks and each of such oxyalkylene blocks is linked at one end to a siloxane block and at the other end to (1) another siloxane block, (2) a monovalent hydrocarbon, (3) a trihydrocarbon-siloxy group, or (4) a hydroxyl group. Crosslinked copolymers having siloxane blocks that contain both trifunctional and difunctional silicon atoms also have oxyalkylene blocks and each of such oxyalkylene blocks is linked at one end to a siloxane block and at the other end to (1) another siloxane block, (2) a hydroxyl group or (3) a trihydrocarbonsiloxy group.

The crosslinked block copolymers of this invention have siloxane blocks wherein each terminal silicon atom is linked to (1) trihydrocarbonsiloxy groups (2) alkoxy groups and/or (3) oxyalkylene blocks. Such terminal silicon atoms are, of course, also linked to one carbon atom of a hydrocarbon group (in the case of terminal trifunctional silicon atoms) or two carbons of hydrocarbon groups (in the case of terminal difunctional silicon atoms).

The linear block copolymers of this invention are linear in nature and, considering only molecular content without regard to particular molecular structure, such copolymers can be represented by the general formula:

(A)     $R'O[(R_2SiO)_x]_a[(C_nH_{2n}O)_y]_b R'$ in which R' is hydrogen or a trihydrocarbonsilyl group when attached to an oxyalkylene polymer and a trihydrocarbonsilyl group or an alkyl group when attached to a siloxane polymer; R is a monovalent hydrocarbon group and which can be the same or different for all R's in the molecule; x is an integer of 2 or more; y is an integer of 5 or more; n is an integer from 2 to 4; and a and b are integers each of which is equal to at least one. By the term "monovalent hydrocarbon group" as used herein, is meant a monovalent group composed of carbon and hydrogen, such as, for example, a group of the aliphatic series including methyl, ethyl, vinyl, allyl, propyl, isopropyl, the butyls, the pentyls and the like; or of the aromatic series of which phenyl, methylphenyl, benzyl and other aralkyl groups are representative or of the cycloaliphatic series of which cyclopentyl, cyclopentenyl, cyclohexyl, cyclohexenyl and the like are representative.

The silicone block in the linear copolymers of this invention is a siloxane linear polymer or chain of recurring siloxane units, (—$R_2SiO$—), and is illustrated by the formula, —$(R_2SiO)_x$—, wherein R is a monovalent hydrocarbon group as previously defined and x is an integer equal to at least two. A silicon block of two units in which all of the monovalent hydrocarbon groups are methyl, —($Me_2SiO$—$Me_2SiO$)—, would have a molecular weight of 148 which is the minimum molecular weight attributable to a silicone block in the compounds of this invention. Silicone blocks having individual molecular weights of as high as 50,000 or higher can be embodied in these novel organo-silicone compounds. Compounds having silicon blocks of molecular weights ranging from 500 to 75,000 to the block are preferred. The monovalent hydrocarbon radicals need not be identical throughout the silicone block but may differ from siloxane unit to siloxane unit or may be different within a single siloxane unit.

The organic blocks of these linear block copolymers linear, predominantly oxyalkylene polymers comprised of recurring oxyalkylene units ($-C_nH_{2n}O-$) joined to each other by carbon-oxygen bonds. They can be individually represented by the general formula:

$$-[C_nH_{2n}O]_y-$$

in which, $n$ is an integer from 2 to 4; and $y$ is an integer of 5 or more. Thus, a polyoxyalkylene block of 5 oxyalkylene units in which $n$ equals 2 throughout each unit has a molecular weight of 220, which is the minimum molecular weight attributable to the organic block of the copolymeric molecule. Organic blocks having molecular weights of up to about 10,000 or higher can be used with molecular weights ranging from 500 to 600 to the block being preferred. The oxyalkylene units, comprising an organic block, are not necessarily identical throughout the block but can be different within each block. An organic block, for example, can be comprised of combinations of oxyethylene units, $-C_2H_4O-$; oxy-1,2-propylene units $-C_3H_6O-$; oxyl-1,3-propylene units, $-C_3H_6O-$; oxyethylene and oxypropylene units, $-C_2H_4O-$, $-C_3H_6O-$; or the oxybutylenes, $-C_4H_8O-$ or mixtures thereof. The oxyalkylene block or blocks of our copolymers are bonded at least at one end to a siloxane block or polymer through carbon-oxy-silicon bonds,

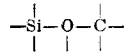

The linear block copolymers of this invention are terminated by monovalent groups from the group of trihydrocarbonsiloxy, hydroxy and alkoxy groups. These terminal groups are hydroxy or trihydrocarbonoxy groups when attached to oxyalkylene blocks and alkoxy or trihydrocarbonsiloxy groups when attached to siloxane blocks.

Thus, the general formula of the linear block copolymers of this invention can be more particularly set forth as follows:

(B)    $R'O[(C_nH_{2n}O)_y]_c[(R_2SiO)_x(C_nH_{2n}O)_y]_d[(R_2SiO)_x]_eR'$ in which R and R' are monovalent groups as previously defined; $n$, $x$, and $y$ are integers with identical meanings as set forth for Formula A; $c$ and $e$ are integers having a value of zero or one; and $d$ is an integer of a value of one or of a greater value. The symbol R' as used in this formula represents a monovalent chain-terminating group which is hydrogen or trihydrocarbonsilyl when terminating an oxyalkylene block end of the copolymeric chain. When terminating a silicone block end of the copolymeric chain, R' is an alkyl group or a trihydrocarbonsilyl group.

This formula is generic to several different types of linear block copolymers all within the scope of the invention. It is to be understood that the compositions of this invention are complex mixtures of constituents generally depicted in Formula B, rather than made of identical organo-silicone block copolymers.

In the first type of linear block copolymers, with reference to Formula B, the integers $c$ and $e$ are both equal to 0 and the integer $d$ is a value of one or more, the general formula of this type being:

(I)    $R''O[(R_2SiO)_x(C_nH_{2n}O)_y]_dH$ wherein R'' designates an alkyl group or a trihydrocarbonsilyl group; R represents a monovalent hydrocarbon group; and $x$, $y$, $n$ and $d$ represent integers as defined in Formula B. The simplest compound of this type, of course, is one in which $d$ is equal to one, $x$ is equal to 2, $y$ has a value of 5, $n$ has a value of 2, R is a methyl group, R' of the silicon block end of the copolymeric chain represents a methyl group and R' of the oxyalkylene block end of the copolymeric chain represents hydrogen. This compound would have a molecular weight of 400 which is the minimum molecular weight for constituents of the compositions of this invention.

Referring to Formula B, a second type of linear block copolymer is one in which $c$ equals one, $e$ equals zero and $d$ has a value of one or more, the general formula of this type being:

(II)    $HO(C_nH_{2n}O)_y[(R_2SiO)_x(C_nH_{2n}O)_y]_dH$ wherein, R designates a monovalent hydrocarbon group; and $x$, $y$, $n$ and $d$ are integers having the same definitions as for those of like designations in Formula B. The simplest compound of this second type is one having the formula of (II), above, in which $d$ is equal to 1, $y$ has a value of 5, $n$ is equal to 2, $x$ has a value of 2, and R is a methyl group. This compound would have a molecular weight of about 606.

A third type of linear block copolymer is characterized by siloxane blocks at each end of the copolymeric chain and can be represented by Formula B when $c$ is equal to zero, $e$ has a value of one and $d$ represents an integer of at least one. This type of block copolymer is more particularly illustrated by the general formula:

(III)    $R''O[(R_2SiO)_x(C_nH_{2n}O)_y]_d(R_2SiO)_xR''$ wherein, R designates a monovalent hydrocarbon group; R'' is an alkyl group or a trihydrocarbonsilyl group and $x$, $y$, $n$ and $d$ are integers having the same value as provided for in Formula B. The simplest compound of this third type, is one which has the formula of (III), above, wherein $x$ has a value of 2, $y$ is equal to 5, $n$ has a value of 2, $d$ equals one, and R and R'' are methyl groups. This compound has a molecular weight of about 562.

According to one method of making our linear block copolymers, the linear copolymers of this invention can be produced by reacting a linear dialkoxy-endblocked polydihydrocarbon siloxane with a linear polyoxyalkylene diol or dihydroxypolyoxyalkylene with the hydroxyl groups of the diol condensing with the alkoxy groups of the polysiloxane in such a manner that polysiloxane blocks are linked to polyoxyalkylene blocks through carbon-oxy-silicon bonds,

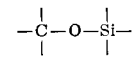

An alkanol is a co-product of the reaction. The molar ratio of diol to polysiloxane in the reaction mixture can be regulated, as desired, to control which of the three types of organo-silicone copolymers will be predominantly produced.

By using equimolar quantities of a linear dialkoxy endblocked polydihydrocarbonsiloxane and a linear polyoxyalkylene diol in the reaction mixture, it is possible to produce the first type copolymer as represented by Formula I and the reaction is illustrated by the following equation:

(Ia)    $zR''O(R_2SiO)_xR'' + zHO(C_nH_{2n}O)_yH \longrightarrow$
$R''O[(R_2SiO)_x(C_nH_{2n}O)_y]_zH + (2z-1)R''OH$ in which, R'' represents an alkyl group; R designates a hydrocarbyl group, $x$, $y$, and $n$ represent integers as previously defined with regard to Formula B; and $z$ is a positive integer.

By using in the reaction mixture, the linear dialkoxy-enblocked polydihydrocarbonsiloxane and the linear polyoxyalkylene diol in a ratio of more than one mole of the diol per mole of the silicone, the resulting product is a copolymer of the second type, as represented by Formula II. The reaction that takes place can be represented by the following equation:

(IIa) $\quad z'R''O(R_2SiO)_xR'' + zHO(C_nH_{2n}O)yH \longrightarrow$

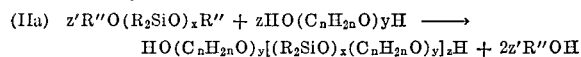
$$HO(C_nH_{2n}O)_y[(R_2SiO)_x(C_nH_{2n}O)_y]_zH + 2z'R''OH$$

wherein, R" designates an alkyl group; R represents a monovalent hydrocarbon group; $x$, $y$ and $n$ designate integers defined in the foregoing presentation of Formula B; and $z'$ is a positive integer and $z$ is a positive integer greater than $z'$.

In producing a linear block copolymer of the third type, represented by Formula III, a polyoxyalkylene diol can be reacted with a dialkoxy-endblocked polydihydrocarbonsiloxane in a ratio of less than one mole of diol per mole of the silicone. The reaction that takes place can be represented by the equation:

(IIIa)

$z''R''O(R_2SiO)_xR'' + zHO(C_nH_{2n}O)_yH \longrightarrow$

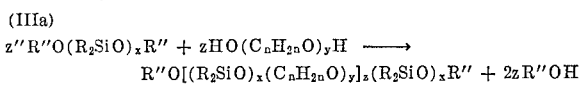
$$R''O[(R_2SiO)_x(C_nH_{2n}O)_y]_z(R_2SiO)_xR'' + 2zR''OH$$

in which, R" is an alkyl group; R is a monovalent hydrocarbon group; $x$, $y$ and $n$ are integers with identical descriptions given with regard to Formula A; and $z$ is a positive integer and $z''$ is a positive integer greater than $z$.

Our linear block copolymers having siloxane blocks terminated at one end by trihydrocarbonsiloxy groups can be produced by employing trihydrocarbonsiloxy- and alkoxy-endblocked polydihydrocarbonsiloxanes in lieu of all or a portion of the dialkoxy-endblocked dihydrocarbonsiloxanes depicted in Equations Ia, IIa and IIIa. One such reaction is illustrated by the equation:

$$Me_3SiO(Me_2SiO)_5C_2H_5 + HO(CH_2CH_2O)_5H \rightarrow$$
$$Me_3SiO(Me_2SiO)_5(CH_2CH_2O)_5H + C_2H_5OH$$

According to another embodiment of our process for producing the linear block copolymers, a polyoxyalkylene diol can first be condensed with a dialkoxy-dihydrocarbonsilane and the resulting product then equilibrated with a cyclic dihydrocarbonsiloxane, e.g. dihydrocarbonsiloxane cyclic trimers or tetramers. The first reaction, i.e. the one that takes place by condensation can be represented by the equation:

(IV)

$zHO(C_nH_{2n}O)_yH + zR''OR_2SiOR'' \longrightarrow$

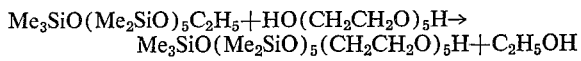
$$R''[(R_2SiO)(C_nH_{2n}O)_y]_zH + (2z-1)R''OH$$

wherein, R" is an alkyl group; R is a monovalent hydrocarbon group; and $n$, $y$ and $z$ are positive integers. The product of this reaction which is a copolymer with a siloxane block of only one silicon atom is then equilibrated with a dihydrocarbonsiloxane cyclic trimer or tetramer. The equilibration can be as represented by the equation which follows:

(V)

$R''O[(R_2SiO)(C_nH_{2n}O)_y]_zH + Z\left(\frac{x-1}{a}\right)(R_2SiO)_a \longrightarrow$

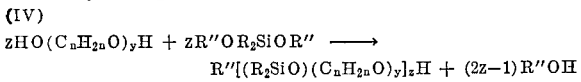
$$R''O[(R_2SiO)_x(C_nH_{2n}O)_y]_zH$$

wherein R" is an alkyl group; R is a monovalent hydrocarbon group; $x$ is an integer from 3 to 4; and $n$, $y$ and $z$ are positive integers. The equilibration (Equation V) can be carried out accordance with the equilibration procedure as, for example, described in the copending application of D. L. Bailey, Ser. No. 398,225, filed Dec. 14, 1953, now U.S. Pat. 2,909,549, in which, dihydrocarbylsiloxane cyclic trimers, tetramers, and higher polymers are equilibrated with polydihydrocarbonsiloxanes under substantially anhydrous conditions and in the presence of alkaline catalysts to produce linear polysiloxanes of greater chain length. It is to be further understood that the molar ratios of oxyalkylene glycol to polysiloxane in the initial reaction mixture of the first stage reaction (Equation IV) can be varied as in the reactions of Equations IIa and IIIa to produce the other types of our compositions.

According to another embodiment of our process our linear block copolymers can be produced by the reaction of a polydihydrocarbonsiloxane containing terminal silanic hydrogen groups, i.e., hydrogen atoms bonded directly to silicon atoms with a polyoxyalkylene hydroxy compound in the presence of an alkaline catalyst, e.g., piperidine. The silanic hydrogen atoms are displaced by oxyalkylene chains which are thus bonded to the siloxane polymer through carbon oxygen-silicon bonds, thereby forming the organo-silicone copolymers of this invention, accompanied by the evolution of gaseous hydrogen as a co-product of the reaction.

The linear alkoxy end-blocked polysiloxane which is a reactant or starting material in the preferred process for making our linear block copolymers can itself be made by reacting a lower molecular weight polysiloxane with a dialkoxy silane. More specifically, a trimeric cyclic siloxane, $(R_2SiO)_3$, or a tetrameric cyclic siloxane, $(R_2SiO)_4$, for instance, can be equilibrated with a dihydrocarbyl dialkoxy silane in the presence of an alkaline catalyst to produce the linear polysiloxane having alkoxy end groups. The molecular weight of the resultant linear polysiloxane is dependent upon the charging ratios employed. The higher the proportion of cyclic trimer or tetramer to the polysiloxane. In the higher molecular weight ranges, the linear polysiloxane is obtained as a complex mixture of constituents, to which can be assigned a number average molecular weight which represents an average of the individual molecular weights of the polysiloxane constituents of the composition and of the proportion in which each is present in the composition. On the other hand, where the proportion of dialkoxy silane to the cyclic trimer or tetramer is high, depolymerization of the latter can result to produce a linear alkoxy, end-blocked polysiloxane starting material of as low as two siloxane units to the molecule, corresponding to the minimum size silicone block. An improved process for making linear alkoxy end-blocked polysiloxanes which are especially suitable for use as starting materials in making our block copolymers is described and claimed in copending application Ser. No. 398,225, filed Dec. 14, 1953, now U.S. Patent 2,909,549. Another method for the preparation of alkoxy-endblocked siloxanes is by controlled hydrolysis of dialkoxysilanes as described in U.S. Pat. No. 2,415,389. For the preparation of alkoxy-endblocked siloxanes of high molecular weight the former method, i.e., the one disclosed in the copending application, is preferred.

The polyoxyalkylene diol which is also a starting material or reactant in the production of our linear block copolymers includes the polyoxyethylene diols, the polyoxypropylene diols, the polyoxybutylene diols, mixed oxyethylene-oxypropylene diols and the like. These polyoxyalkylene diols, many, if not all, of which are available commercially in a wide range and variety of molecular weights, can themselves be made by reacting the corresponding alkylene oxide, or oxides with a diol starter. In this connection it is to be noted that when glycerol is used as a starter, according to our experience, addition of the alkylene oxide takes place at the two primary alcohol groups of the glycerol and the polyoxyalkylene addition product exhibits many of the properties characteristic of a diol of corresponding molecular weight. Alkylene oxide-glycerol addition products can also be used in making our block copolymers. When more than one alkylene oxide is employed, they can be added to the diol starter sequentially, or they can be first admixed and the admixture added to the diol starter, or they can be added to the diol starter in any other manner. United States Pat. No. 1,921,378 describes a method of making addition products of ethylene oxide or of propylene oxide, and mixed oxyethylene-oxypropylene diols are described in Pat. No. 2,425,845. Polyoxybutylene diols can be made by the reaction of a butylene oxide in the presence of a catalyst for the condensation, for instance, borontrifluorideetherate. Mixtures of different polyoxyalkylene diols can also be used as starting materials in producing our block copolymers.

It is also well known that polyoxyalkylene diols can be made by reacting alkylene oxides with other compounds having labile hydrogen atoms. Examples of such compounds are alkyl and aryl dithiols, such as, ethylene dithiol, and alkyl and aryl diamines, such as, hexamethylene diamine and m-phenylene diamine. Such polyoxyalkylene diols made from these diverse starting materials also form block copolymers of the same general type with polysiloxane polymers since the starting fragment of such polyoxyalkylene diol forms an insignificant fraction of the block copolymer.

The condensation reactions depicted in Equations (Ia), (IIa) and (IIIa) for forming the linear block copolymers according to our preferred process are reversible reactions and require means for forcing these reactions to completion. Many such means are known in the art. One effective means for forcing the reactions toward completion is the removal of alcoholic co-products, designated as R'OH from the reaction mixture. It is also apparent that the ultimate quantity of the alcoholic product, R'OH removed from each reaction mixture provides an indication of the extent to which that particular condensation reaction between the dialkoxy-endblocked polydihydrocarbylsiloxane and the polyoxyalkylene diol reactants has reached completion. Additionally, the rate at which the alcoholic product is removed from the reaction mixture serves to indicate the rate at which the reaction is progressing. That is, if a large quantity of alcoholic product is removed within a short period of reaction time, it may be concluded that the reaction is proceeding at a rapid rate, whereas the reaction is proceeding at a slow rate if the amount of alcoholic product removed in a given time is small.

Complete compatibility of the reactants is preferred, although not essential for the reaction to proceed at a reasonable rate. Most alkoxy-endblocked polysiloxanes are incompatible with polyoxyalkylene diols or their monoethers. In such cases the two substances can be brought into reactive contact by dissolving them in a common solvent, although other measures can be employed instead. Suitable solvents are, for example, toluene or xylene, in which both reacting substances are mutually soluble. In some instances, where large molecular weight polyoxyalkylene diols are employed as reactants, complete compatibility of the reactants may not be attainable. The reaction in such instances progresses, but at a slower rate. The boiling point of a mutual solvent can be used to effectively control the reaction temperature. In controlling reaction temperature, a reflux condenser can be useful in maintaining the reaction mixture substantially at the boiling point of the mutual solvent under atmospheric or other pressures.

The condensation reaction is carried out preferably at temperatures in the range from 80° C. to 200° C. Undesirable side reactions forming water as a co-product are encouraged at temperatures above this range. Contamination by materials formed by these side reactions can be tolerated in most uses of our organo-silicone block copolymers. However, it may be desirable to remove these materials when formed and it is preferable to prevent their formation by choice of reaction temperature. At temperatures below this range the condensation reaction proceeds at a slow rate or not at all.

The catalyst employed in the above-mentioned condensation reactions are, in general, the carboxylic acids, including trifluoroacetic acid, perfluorobutyric acid, perfluoroglutaric acid, monochloroacetic acid, acetic acid, etc., or alkaline substances, such as potassium silanolate, $KO(SiO_2O)_nK$, wherein $b$ is a positive integer and R is an alkyl radical such as ethyl or methyl. The carboxylic acid catalysts are active with most starting materials, and are effective in low concentrations, e.g., as low as 0.1 percent by weight of the starting materials. They produce colorless to light-colored block copolymers and do not cause any degradation of the polysiloxane molecules to result in copolymeric products which are low in silicon content, as is the tendency of strong acid catalysts and alkaline catalysts. Of the carboxylic acid catalysts, the polyhalogen substituted aliphatic carboxylic acids particularly, trifluoroacetic acid, perfluorobutyric acid, and perfluoroglutaric acid, provide exceptionally high catalytic activities and are preferred.

Alkaline catalysts, in particular potassium silanolate containing about 3.0 percent by weight of potassium exhibit very high catalytic activity. The use of alkaline catalysts tends also to favor degradation of the polysiloxane chain during the condensation reaction with the formation of a corresponding cyclic polysiloxane and organosilicone products which are low in silicon content. The degradation reaction is of the reversible type and may be opposed by adding to the initial reaction mixture the cyclic polysiloxane which is formed by the degradation reaction. For example, in producing polydimethylsiloxane-polyoxyalkylene diol block copolymers with potassium silanolate as a catalyst, we have observed that the addition of appreciable amounts of the cyclic tetramer of dimethylsiloxane results in products which have the theoretical silicon contents for the particular block copolymers desired to be formed without any accompanying degradation of starting material.

Neutral and mildly basic aqueous solutions of the water-soluble types of linear polysiloxane-polyoxyalkylene block copolymers of this invention are stable against hydrolysis and remain clear and homogeneous for extremely long periods of time. Strong acids and bases added to, or initially present in and unremoved from, these solutions tend to attach the hydrolyzable carbon-oxy-silicon bonds present in the molecules of said compounds to bring about the hydrolysis of the polysiloxane-polyoxyalkylene block copolymers within a short time. Upon the addition of trifluoroacetic acid, for example, to an aqueous solution of water-soluble polysiloxane-polyoxyalkylene block copolymers these solutions have been observed to become turbid within several minutes and to separate into a polyoxyalkylene glycol aqueous layer and a silicon oil or polysiloxane layer. The removal or neutralization of the acid catalyst employed in the condensation reaction, therefore, is desirable to provide a hydrolytically stable polysiloxane-polyoxyalkylene block copolymer. Neutralization of the acid catalyst with stoichiometric amounts of a weak organic base, e.g., triethanolamine, monoethanolamine, monoisopropanolamine, dibutylamine, etc., or sodium bicarbonate, anhydrous ammonia, etc., is to be preferred over the removal of the catalyst, as by washing with water, and subsequent treatment with an adsorptive material such as silica gel or "Magnesol."

Some of our linear block copolymers are water-soluble, and block copolymers having that fraction of their molecular weight which is attributable to the oxyethylene groups approximately equal to or greater than those fractions which are attributable to either the polysiloxane units or to oxypropylene or oxybutylene units are water-soluble. The water-soluble block copolymers are useful as rubber lubricants, particularly for tire molds, where their water-solubility permits them to be readily applied from an aqueous solution or emulsion. The lubricant can then be readily removed from the molded article by washing with water. Such property of ready removal by water-washing also enhances their utility as textile lubricants.

The water-soluble linear block copolymers are also mixable with water-soluble polyoxyalkylene diols, monoethers, and diethers and are useful as lubricants and hydraulic fluids in combination with such diols, monoethers and diethers, or with ethylene glycol or propylene glycol. The water-soluble block copolymers form useful ingredients of lubricants having a water base, commonly termed "hydrolubes." The alkoxypolysiloxanes are themselves water-insoluble, and immiscible with the above-mentioned materials, and our block copolymers have greatly enhanced utility over them.

Linear block copolymers wherein oxyalkylene units of the polyoxyalkylene block contains three or more carbons to the unit with but few or no oxyethylene units present are not water-soluble. They are miscible, however, with the starting polyoxyalkylene diols, or the corresponding monoether or diethers, and are useful as lubricating compositions in combination therewith.

Our linear block copolymers having at least limited water-miscibility and, especially, those copolymers prepared from polyoxyethylene diols as the polyoxyalkylene diol reactant, exhibit excellent emulsifying properties in such systems as benzene-water, silane-water, silicone oil-water mixtures and the like. In block copolymers where the polysiloxane blocks and polyoxyalkylene blocks are of the same or similar lengths, the emulsifying properties of the copolymers are enhanced. Emulsions prepared from our water-soluble block copolymers can be readily broken by the addition of acidic materials. This latter characteristic of emulsions obtained through the use of the water-soluble block copolymers, additionally, lend these copolymers to uses as "fugitive" emulsifying agents.

Another property of water-soluble linear block copolymers is the high surface activity of their aqueous solutions. In one instance of a 0.05 percent by weight aqueous solution of a block copolymer, prepared from a poly oxyethylene glycol having an average molecular weight of 550 and an alkoxy-endblocked polydimethylsiloxane having an average molecular weight of 1036, the surface tension measured 28.5 dynes/centimeters at 25° C., while the surface tension of an aqueous solution of a commercially available detergent under the same conditions measured 33.2 dynes/centimeter.

Our linear block copolymers differ from other organopolydihydrocarbylsiloxane block and of the polyoxyalkylene block can be predetermined and controlled to thereby provide a wide range of compositions. The average molecular weight and molecular content of the copolymeric product is controlled (1) by the selection of starting materials having the desired molecular weights and (2) by adjusting the molar ratio in which these starting materials are present in the initial reaction mixture.

Polyoxyalkylene diols and dialkoxy polyhydrocarbonsiloxanes vary widely in molecular weights and thus a broad field for the selection of varied molecular weight starting materials is available. Hence, the linear block copolymers may comprise one or more short, medium or long polysiloxane blocks in combination with one or more short, medium or long oxyalkylene blocks.

In addition, the molar ratio of polyoxyalkylene diol to polysiloxane may be varied over wide ranges to produce linear copolymeric products having diverse average molecular weights and different properties. When this molar ratio is greater or less than 1, one or the other of the starting material tends to endblock the copolymeric chain being formed during its early stages of growth, and thereby restrict the length of said chain. For example, when the molar ratio of diol to polysiloxane is greater than 1 there is the tendency for the copolymeric chain to become endblocked by the diol, thereby being limited in length. In thus endblocking the copolymeric chain by the diols, the average molecular weight of the resulting copolymeric product may be maintained at a lower level than that of a copolymeric product produced from a reaction mixture in which the molar ratio of glycol to polysiloxane is more nearly equal or equal to 1, in the latter case the tendency towards end-blocking by either one of the starting materials being remote. The copolymeric product obtained by using a molar ratio of diol to siloxane of about 1 is believed to be more nearly of the type shown in Formula I while the block copolymer produced by using the diol to siloxane molar ratio of greater than 1 can be regarded as more nearly of the type shown in Formula II. Similarly, when the molar ratio of diol to polysiloxane is less than 1, the polysiloxane tends to endblock the copolymeric chain to restrict the growth of said chain and, thereby, limit the ultimate molecular weight of the copolymer. In this latter case a block copolymer predominantly of the type shown in Formula III is believed to be produced.

A few of the many possible combinations are shown in the table below:

TABLE I.—AVERAGE MOLECULAR WEIGHTS OF LINEAR BLOCK COPOLYMERS

| Average molecular wgt. of polysiloxane block | Molar ratio of oxyalkylene to polysiloxane blocks | Average molecular wgt. of oxyalkylene block | | |
|---|---|---|---|---|
| | | 500 | 1,000 | 5,000 |
| 500 | 1:2 | 1,500 | 2,000 | 6,000 |
| | 9:10 | 9,500 | 14,000 | 50,000 |
| | 10:9 | 9,500 | 14,500 | 54,500 |
| | 2:1 | 1,500 | 2,500 | 10,500 |
| 1,000 | 1:2 | 2,500 | 3,000 | 7,000 |
| | 9:10 | 14,500 | 19,000 | 55,000 |
| | 10:9 | 14,000 | 19,000 | 59,000 |
| | 2:1 | 2,000 | 3,000 | 11,000 |
| 5,000 | 1:2 | 10,500 | 11,000 | 15,000 |
| | 9:10 | 54,500 | 59,000 | 95,000 |
| | 10:9 | 50,000 | 55,000 | 95,000 |
| | 2:1 | 6,000 | 7,000 | 15,000 |

The linear block copolymers of this invention thus form useful compositions over a wide range of polysiloxane content from about 5 percent to about 95 percent by weight as shown by the above table.

As illustrations of the various types of linear block copolymers which are obtainable in accordance with the teachings of this invention, specific examples of block copolymers prepared from polysiloxanes and particular polyoxyalkylene diols are presented. In these examples the average molecular weights of the polyoxyalkylene diols represented are those determined from acetyl values, except where indicated otherwise, and those of the dialkoxy-polydihydrocarbonsiloxanes were determined from charging ratios used in the preparation of said siloxanes or from cryoscopic values of said siloxanes in cyclohexane.

In the examples, reduced specific viscosities were determined by measuring viscosities of solutions containing one gram of block copolymer sample in 100 milliliters of toluene and employing the formula below.

$$\text{Reduced specific viscosity} = \frac{\frac{(N_c)}{N_0} - 1}{C}$$

$N_c$ is the solution viscosity in centipoise at 20° C., $N_0$ is the solvent viscosity in centipoise at 20° C. and C is the concentration of sample in grams per 100 milliliters of solution.

Linear block copolymers from polyoxythylene glycols and dialkoxy polydihydrocarbonsiloxanes The polyoxyethylene glycol molecule is particularly characterized by two hydroxyl groups which may be readily reacted. When mixed with alkoxy-endblocked polysiloxanes and heated in the presence of a suitable catalyst, as for example, a carboxylic acid or an alkaline substance, they condense with said polysiloxanes to form block copolymers constituted by molecules having one or more polyoxyethylene glycol chains connected to one or more polysiloxane chains.

Our linear block copolymers range from viscous liquids to high melting solids and from water-soluble to water-insoluble. For example, a block copolymer, produced from diethoxy polydimethylsiloxane having an average molecular weight of 1036 and polyoxyethylene glycol having an average molecular weight of 550, is water-soluble. A block copolymer obtained from the condensation of diethoxy polydimethylsiloxane having an average molecular weight of 16,000 and polyoxyethylene glycol having an average molecular weight of 6000 is water-insoluble. Block copolymers containing higher percentages of oxyethylene units have been observed to exhibit greater water solubility than block copolymers containing lower percentages of oxyethylene units. The following table illustrates water-solubilities corresponding to various percentages of oxyethylene in copolymers prepared from equimolar quantities of polyoxyethylene glycols and ethoxy-endblocked polydimethylsiloxanes.

TABLE II

| Average molecular weight of polydimethylsiloxane | Average molecular weight of polyoxyethylene glycol | Percent by weight of oxyethylene groups in copolymer | Water solubility of organo-silicone copolymer |
|---|---|---|---|
| 518 | 550 | 51.5 | Soluble. |
| 1,036 | 550 | 34.6 | Do. |
| 16,000 | 6,000 | 27.3 | Insoluble. |

In general, polyoxyethylene-polydihydrocarbonsiloxane copolymers containing more than about 28 to 34 percent by weight of oxyethylene groups are water-soluble while those with a lower weight percent are water-insoluble.

Our water-soluble linear block copolymers are particularly useful in those systems listed previously. They are also useful in many other systems containing two or more immiscible components. We have found that those systems containing one, or more than one, component which is miscible with polyoxyethylene glycol and one other, or more than one other, component which is miscible with linear polysiloxanes are particularly suited for emulsification by our polyoxyethylenepolysiloxane block copolymers. By our invention it is now possible to prepare aqueous solutions containing polysiloxanes for use, as tire mold release agents and in textile lubricating agents where it is desired to provide a simple and inexpensive vehicle for these agents. The insoluble polyoxyethylenepolydihydrocarbonsiloxane copolymers are also useful as mold release agents and, additionally as lubricants and rubber plasticizers.

The oxyalkylene blocks in the crosslinked copolymers of this invention are of the same type as the oxyalkylene blocks in the linear block copolymers of this invention. Such oxyalkylene blocks are fully described above.

The siloxane block in the crosslinked block copolymers of this invention is composed of silicon, oxygen, carbon and hydrogen and comprises one or more recurring trifunctional silicon unit, $RSiO\equiv$, which can be graphically represented by the formula:

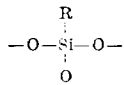

in which R is a monovalent hydrocarbon group as defined above or a polyvalent hydrocarbon group (e.g.

—$CH_2CH_2$—, —$CH_2CH_2CH_2$— and —$CH_2CH_2CH{<}$)

and need not be the same throughout the siloxane block. The trifunctional silicon unit is interconnected from 1 to 3 other silicon atoms of the siloxane polymer through oxysilicon bonds,

A general formula of many crosslinked block copolymers of this invention is as follows:

$$(R')(SiO_3)_x(R_2SiO)_y[(C_nH_{2n}O)_zH]_a[R''']_{3x-a} \quad (i)$$

where $x$ is an integer and represents the number of trifunctional silicon atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyallkylene group; and $z$ is an integer having a value of at least 5 and denotes the length of the oxyalkylene chain. It will be understood further that such compositions of matter are mixtures of such block copolymers wherein $y$ and $z$ are of different values and that methods of determining the chain length of the polysiloxane chains and the polyoxyalkylene chains give values which represent average chain lengths. In the above Formula i, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si$— where R is a monovalent hydrocarbon radical and terminates a siloxane chain, and R' represents a monovalent or polyvalent hydrocarbon radical, being monovalent when $x$ is 1 divalent when $x$ is 2, trivalent, when $x$ is 3, tetravalent and when $x$ is 4.

One type of crosslinked block copolymer is represented when $x$ in Formula i is one, and in this instance a branched-chain formula may be postulated as follows:

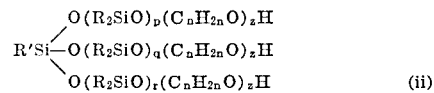
(ii)

where $p+q+r=y$ of Formula i and has a minimum value of 3, the other subscripts being the same as in Formula i. In this instance, all three of the oxyalkylene chains are joined to the end of polysiloxane chains of the type —$(R_2SiO)$—. However, another type of branched-chain block copolymer exists when one of the oxyalkylene chains is attached through an oxygen atom to the trifunctional silicon atom bonded only to a single monovalent hydrocarbon radical (R'). This formula may be given as follows:

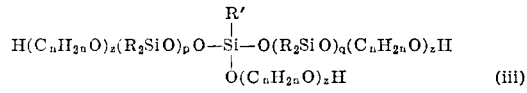
(iii)

where $p+q=y$ of Formula i and has a minimum value of 3.

Another type of crosslinked block copolymer is represented when there are present therein two trifunctional silicon atoms each bonded to a single divalent hydrocarbon radical, and correspondingly present therein six polyoxyalkylene chains. Such block copolymers may be represented by the formula:

$$(O_3SiR'SiO_3)(R_2SiO)_y[(C_nH_{2n}O)_zH]_6 \quad (iv)$$

where R, $y$, $n$ and $z$ are as designated for Formula i, and R' is a divalent hydrocarbon radical. Expressed in structural form these block copolymers may be represented by the following formula:

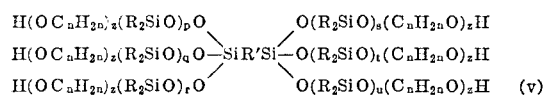
(v)

where $p+q+r+s+t+u$ is equal to $y$ of Formula i and in this instance has a minimum value of 6.

Our crosslinked copolymers can be advantageously made by reacting an alkoxy trifunctional siloxane polymer with a hydroxy oxyalkylene polymer accompanied by the elimination of a molecule of an alkanol for each hydroxyl group of the hydroxy oxyalkylene polymer reacted and the attachment of one or more blocks of the oxyalkylene polymer to a block of siloxane polymer through a silicon-oxy-carbon bond for each molecule of alkanol removed. This reaction which is aptly called a condensation reaction can be illustrated by the following equation:

(A)

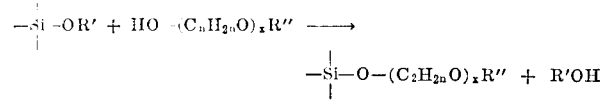

where R' is an alkyl group and R'' is a monovalent group from the class of monovalent hydrocarbon groups and hydrogen. In the case where R'' is hydrogen the reaction can continue in a manner illustrated by the following equation:

(B)
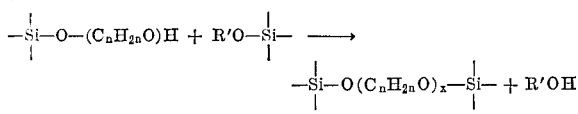

$$-\overset{|}{\underset{|}{\text{Si}}}-\text{O}-(\text{C}_n\text{H}_{2n}\text{O})\text{H} + \text{R}'\text{O}-\overset{|}{\underset{|}{\text{Si}}}- \longrightarrow$$

$$-\overset{|}{\underset{|}{\text{Si}}}-\text{O}(\text{C}_n\text{H}_{2n}\text{O})_x-\overset{|}{\underset{|}{\text{Si}}}- + \text{R}'\text{OH}$$

The condensation reactions depicted in the above Equations A and B for forming the crosslinked block copolymers are essentially reversible reactions and are advantageously forced to completion by the removal of alcoholic products, generally designated as R'OH, from the reaction mixtures. It is apparent, furthermore, that the ultimate quantity of the alcoholic product removed from each reaction mixture provides an indication of the extent to which that particular condensation reaction between the alkoxy polysiloxane and the hydroxyoxyalkylene polymer reactants has reached completion. The rate at which the alcoholic product is removed from the reaction mixture additionally serves to indicate the rate at which the reaction is progressing. That is, if a large quantity of alcoholic product is removed within a short period of reaction time, it may be concluded that the reaction is proceeding at a slow rate if the amount of alcoholic product removed in the given time is small.

Most alkoxy-containing trifunctional polysiloxanes are compatible with hydroxy oxyalkylene polymers and readily react therewith. Thus, the reaction of Equations A and B can be carried out by heating simple mixtures of the silicone and glycol reactants and the catalyst at a temperature within the range of 80° C. to 250° C. However, the reactions appear to be more efficient when the reactants are dissolved in a suitable solvent, such as, for example, toluene or xylene, in which the reacting substances are mutually soluble and, thus, brought into intimate contact. The reaction temperature can be readily controlled by the reflux temperature of the polysiloxane-polyoxyalkylene mono-ol or diol solution and higher boiling solvents will permit higher reaction temperatures. Although the type of solvent is not critical to the success of the condensation reaction, it is preferable that the starting materials be mutually soluble therein. It is also advantageous to employ an amount of said solvent which is sufficient to provide a homogeneous solution of the starting materials at the reaction temperature. Such a reaction in a suitable solvent provides a more rapid condensation which more nearly approaches completion than in a similar reaction carried out in the absence of a mutual solvent.

Although the use of toluene and xylene as mutual solvents for the reaction mixture of this invention involving reactions A or B provides a high enough reaction temperature to carry out the condensation reaction to completion, under reflux at atmospheric pressure, toluene in certain instances, is to be preferred for practical reasons over xylene. It has been found that in some condensation reactions using reflux at atmospheric pressure for temperature control the higher reflux temperature provided by xylene as a solvent encourages undesirable side reactions producing water instead of the expected alcoholic product. This difficulty can be overcome by any suitable means, for example, by the use of reduced pressures, or by the use of a solvent, such as toluene, which provides a lower atmospheric reflux temperature, and thus, by lowering the reaction temperature, eliminate or lessen the tendency towards side reactions. When toluene is used as a solvent the alcoholic product, resulting from the condensation reaction, is removed as an azeotrope with toluene.

The catalyst which can be employed in the condensation reactions are depicted by equations A and B are, in general, the organic acids, including trifluoroacetic acid, perfluorobutyric acid, perfluoroglutaric acid, monochloroacetic acid, acetic acid, etc. or alkaline substances, such as potassium silanolate, $\text{KO}(\text{SiR}_2\text{O})_b\text{K}$, wherein $b$ is a positive integer and R is an alkyl radical such as ethyl or methyl. The organic acid catalysts are active with most starting materials, and are effective at low concentrations, e.g., as low as 0.1 percent by weight of the starting materials. They produce colorless to light-colored block copolymers and do not cause any degradation of the polysiloxane molecules to result in copolymeric products which are low in silicon content as is the tendency of mineral acid catalysts and alkaline catalysts. Of the organic acid catalysts, trifluoroacetic acid, perfluorobutyric cid, and perfluoroglutaric acid provide exceptionally high catalytic activities, and therefore, are to be preferred.

The alkaline catalysts, in particular potassium silanolate containing about 3.0 percent by weight of potassium, exhibit very high catalytic activity. The use of alkaline catalysts, in some cases, tends to cause the degradation of the polysiloxane block during the condensation reaction to produce the corresponding cyclic polysiloxanes and organo-silicone products which are low in silicon content. The degradation reaction is of the reversible type and can be opposed by the addition to the initial reaction mixture of the cyclic polysiloxane expected to be produced by the degradation process brought about under the influence of the alkaline catalyst.

While neutral and mildly basic aqueous solutions of the water-soluble types of crosslinked block copolymers of this invention are stable against hydrolysis and remain clear and homogeneous for extremely long periods of time, strong acids and bases added to or initially present in and unremoved from these solutions tend to attack the hydrolyzable Si—O—C— bonds present in the molecules of said compounds to bring about the hydrolysis of said polysiloxane-polyoxyalkylene block copolymers within a short time. The addition of hydrochloric acid, for example, to an aqueous solution of water-soluble polysiloxane-polyoxyalkylene block copolymers caused these solutions to become turbid within several minutes and separate into polyoxyalkylene glycol monoether aqueous layer and silicone oil or polysiloxane layer. The removal or neutralization of the acid catalyst employed in the condensation reaction, therefore, may be desirable to provide a hydrolytically stable polysiloxane-polyoxyalkylene block copolymer. The neutralization of catalysts with stoichiometric amounts of a weak organic base, e.g., triethanolamine, monoethanolamine, monoisopropanolamine, dibutylamine, etc., or sodium bicarbonate, anhydrous ammonia, etc., is to be preferred over the removal of the catalyst, as by washing with water, and subsequent treatment with absorption material such as silica gel or "Magnesol," inasmuch as the latter process results only in an incomplete removal of the residual acid catalyst.

According to another embodiment of our process for producing the crosslinked block copolymers, the hydroxy oxyalkylene polymer can first be condensed with a trialkoxy monohydrocarbonsilane and the resulting product then equilibrated with a cyclic polydihydrocarbonsiloxane, e.g., the cyclic trimers or tetramers. The condensation reaction can be carried out as described above and the equilibration can be carried out in accordance with any suitable equilibration procedure, for example, as described in U.S. Pat. No. 2,453,092.

According to still another embodiment of our process, our crosslinked block copolymers can be produced by the reaction of a polydihydrocarbonsiloxane containing silanic hydrogen atoms attached to difunctional silicon units with a hydroxy oxyalkylene polymer in the presence of an alkaline catalyst, e.g., piperidine. The silanic hydrogen atoms are displaced by oxyalkylene chains which are thus bonded to the siloxane polymer through carbon-oxysilicon bonds, thereby forming the organo-silicone block copolymers of this invention, accompanied by the evolution of gaseous hydrogen as a co-product of the reaction.

The alkoxy trifunctional hydrocarbonsiloxane polymers which are reactants or starting materials for the production of the block copolymers of this invention are siloxane polymers which comprise one or more trifunctional silicon units to each of which is connected from one to two alkoxy groups. These siloxane polymers comprise recurring silicon units which can be represented by the formula:

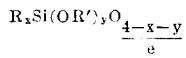

wherein, R is a monovalent hydrocarbon group, R' is an alkyl group, $x$ is an integer from one to three, $y$ is an integer from zero to three, and the sum of $x$ and $y$ is an integer from one to three, and $x$ and $y$ need not be the same throughout the polymer molecule. The polymer molecule contains at least one silicon unit in which $x$ and $y$ are individually equal to 1.

Alkoxy trifunctional hydrocarbonsiloxane polymers can be made by any of the many methods known in the art. Illustratively, such trifunctional siloxane polymers are made by reacting a polysiloxane with a trialkoxysilane. More specifically, as described in the copending application of D. L. Bailey, Ser. No. 398,225, filed Dec. 14, 1953, now U.S. Patent 2,909,549, a trimeric cyclic siloxane $(R_2SiO)_3$, or a tetrameric cyclic siloxane $(R_2SiO)_4$, can be equilibrated with a monohydrocarbon trialkoxysilane in the presence of an alkaline catalyst to produce linear trialkoxypolysiloxanes having alkoxy groups attached to silicon atoms which are located intermediately in the polymer chains, as for example:

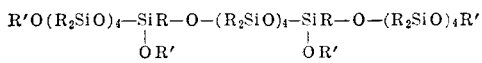

where, R designates a monovalent hydrocarbon group, and R' designates an alkyl group. The molecular weight of the resultant alkoxy trifunctional siloxane polymer can be controlled by the charging ratios employed; the higher the proportion of cyclic trimer or tetramer to the trialkoxysilane, the higher the molecular weight of the resultant product. By employing monofunctional siloxanes (e.g. $Me_3SiOSiMe_3$) along with the other reactants in such equilibration reactions, products having trihydrocarbonsiloxy end-blocking groups e.g.

$$[Me_3SiO(Me_2SiO)_5]_2Si(Me)OC_2H_5$$

can be obtained. The latter products can be reacted as described above with hydroxy oxyalkylene polymers to produce our block copolymers wherein the siloxane block has trihydrocarbonsiloxy end-blocking groups. The latter reaction is illustrated by the equation:

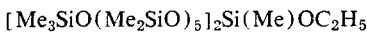

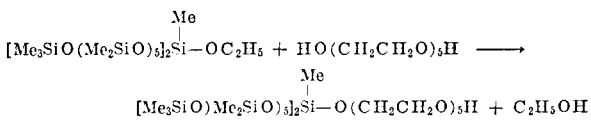

Trifunctional siloxane polymers, themselves, can be reacted with monohydrocarbon trialkoxysilanes to produce alkoxy siloxane polymers of higher molecular weight. For example, the reaction between a trifunctional siloxane polymer of the type,

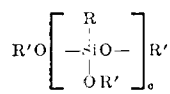

R, being an alkyl group, R' being a monovalent hydrocarbon group and $c$ being an integer, and a trialkoxysilane forms mixtures of polymers of the following type structures:

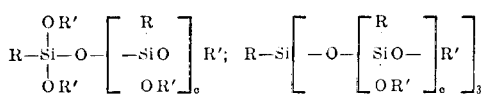

wherein R designates a monovalent hydrocarbon group, R' represents an alkyl group and $c$ is a positive integer. Polymers produced from the reactants cited in this paragraph take on many different forms, two of which have been shown. In this case, also, the molecular weights of the products can be controlled by the charging ratios employed. A higher ratio of siloxane to silane produces a higher molecular weight product. In addition, cyclic, highly branched chain and crosslinked varieties of the two polymers illustrated above are produced. Complex mixtures of alkoxy-containing trifunctional siloxane polymers can be prepared by reacting mixtures of difunctional siloxanes with trialkoxysilanes and mixtures or trifunctional siloxanes with mono-, di-, or trialkoxysilanes or mixtures thereof.

Hydroxy oxyalkylene polymers employed in the reaction to form our crosslinked block copolymers must possess a minimum chain length to be effective for the purposes of this invention. Such chain length is herein defined as a minimum of five oxyalkylene units which is the chain length found necessary to exert a significant effect on such properties as solubility and lubricity of the block copolymers. The specific effect contributed by the polyoxyalkylene chain will vary with the type of oxyalkylene unit making up the chain. Thus, polysiloxanepolyoxyalkylene block copolymers in which the oxyalkylene units are composed of oxypropylene units are water-insoluble, whereas the molecules may be water-soluble when the oxyalkylene unit is oxyethylene, depending on the polysiloxane-polyoxyethylene ratio. The polyoxyalkylene block copolymers will vary in solubility from water-soluble to water insoluble when the polyoxyalkylene chain is composed of both oxyethylene and oxypropylene units depending on their ratio and on the polysiloxane-polyoxyethylene ratio.

The polyoxyalkylene diols which can be employed as starting materials in the production of our crosslinked block copolymers include the polyoxyethylene diols, the polyoxypropylene diols, the polyoxybutylene diols, mixed polyoxy ethylene-oxypropylene diols and the like. These polyoxy-alkylene diols, many, if not all, of which are available in a wide range and variety of molecular weights, can themselves be made by reacting the corresponding alkylene oxide or oxides, with a diol starter. In this connection it is to be noted that when glycerol is used as a starter, according to our experience, addition of the alkylene oxide takes place at the two primary alcohol groups of the glycerol and the polyoxyalkylene addition product exhibits many of the properties of a diol of corresponding molecular weight. Alkylene oxide-glycerol addition products can also be used in making our block copolymers. When more than one alkylene oxide is employed, they can be first admixed and the admixture added to the starter, or they can be added to the starter in any other manner. United States Pat. No. 1,921,378 describes a method of making addition products of ethylene oxide or of propylene oxide and mixed oxyethylene-oxypropylene diols are described in United States Pat. No. 2,425,845. Polyoxybutylene diols can be made by the reaction of a butylene oxide in the presence of a catalyst for the condensation, for instance, borontrifluoride-etherate. Mixtures of different polyoxyalkylene diols can also be used as starting materials in producing our block copolymers.

It should be noted that by using an excess of the dihydroxypolyoxyalkylene polymer we avoid excessive crosslinking between the starting materials and also provide for the ready completion of the reaction which leads to the production of copolymers which are predominantly of the type set forth in Formula ii. Undoubtedly some crosslinking will occur during the reaction and the presence of some amounts of crosslinked copolymers (both partial and complete) will be present in the reaction product. Thus, for example, a small amount of partially crosslinked copolymers of the following type is probably present in the reaction product.

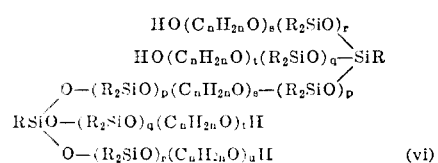

(vi)

Crosslinked polymers of the above type are for the most part soluble in the reaction and will not materially affect the useful properties thereof. However, if some amounts of completely crosslinked materials are present they will be insoluble in the reaction product and can be removed therefrom by filtration or other suitable means.

Polyoxyalkylene mono-ols which can also be used as starting materials in the production of our crosslinked block copolymers can be made in accordance with known methods by reacting the corresponding alkylene oxide or oxides with a mono-ol starter.

Monohydroxy polyoxypropylene monoethers, i.e., polyoxypropylene mono-ols, suitable for the practice of the invention are described in Fife and Roberts U.S. Pat. No. 2,448,664. In addition, polyoxyalkylene monoethers containing both oxyethylene and oxypropylene groups in the molecule may be formed by the addition of ethylene oxide and propylene oxide to a monohydric alcohol to form oxyalkylene chains composed of oxyethylene groups and oxypropylene groups. Monohydroxy oxyethylene-oxy-1,2-propylene monoethers having both oxyethylene and oxypropylene groups in the molecule are described in Roberts and Fife U.S. Pat. No. 2,425,755.

Other hydroxy oxyalkylene polymers which can be used in preparing our crosslinked copolymers and methods for their preparation are described in the A.C.S. Monograph No. 114, entitled "Glycols," K. O. Curme and F. Johnston, Editors, Reinhold Publishing Corp., 1952. It is also well known that hydroxy oxyalkylene polymers can be made by reacting alkylene oxides with other compounds having a labile hydrogen atom. Examples of such compounds are alkyl and aryl thiols, such as ethyl and butyl thiols, and alkyl and aryl amines and diamines, such as mono-butyl- and dibutylamine, hexamethylene diamine and aniline. Such hydroxy oxyalkylene polymers made from such diverse starting materials also form block copolymers of the same general type with polysiloxane polymers as the starting fragment of the hydroxy oxyalkylene polymer forms an insignificant fraction of the block copolymer.

A unique property of some crosslinked block copolymers introduced by this invention is their water-insolubility, and block copolymers having that fraction of their molecular weight which is attributable to oxyethylene units approximately equal to or greater than those fractions which are attributable to the sum of polysiloxane units, and oxypropylene and/or oxybutylene units are water-soluble, and are at least partially water-soluble when the mole-fraction of oxyethylene units is at least one-fourth of the sum of mole-fractions of the oxybutylene and/or oxypropylene units and the siloxane units. Certain of the water-soluble copolymers are also soluble in some organic solvents such as benzene and are useful as emulsifying agents for water-silicone and water-organic solvent mixtures. Other of the water-soluble copolymers particularly those containing attached vinyl groups are useful as sizes for fibrous glass.

Our crosslinked block copolymers wherein the polyoxyalkylene block contains few or no oxyethylene units are not water-soluble, but they can be mixed with the starting monohydroxy polyoxyalkylene monoethers or the corresponding diols, or diethers, and form useful compositions in combination therewith. A typical example is the mixture of mono-butyl ether of polyoxy-1,2-propylene glycol and the block copolymer produced from the reaction of this glycol with an alkoxy trifunctional hydrocarbyl polysiloxane. Such a mixture exhibits markedly improved lubricating properties.

A truly remarkable property of certain of our crosslinked block copolymers is their load-carrying capacity as metal-to-metal lubricants for moving surfaces. Silicone fluids, such as dimethyl silicone oils, are very poor lubricants for such service, having practically no load-carrying capacity. However, it has been found that the block copolymers, whose polysiloxane content corresponds to a silicon content of between 2 percent and 25 percent silicon by weight are excellent metal-to-metal lubricants and have better load-carrying capacity than the polyoxyalkylene fluids and dimethyl silicone oils.

The block copolymers of this invention of both the linear variety and the crosslinked variety which contain an oxyalkylene block terminated with a trihydrocarbonsiloxy group are readily prepared from otherwise identical copolymers of this invention containing hydroxyl chain terminating groups. Such hydroxyl chain terminating groups are readily converted to trihydrocarbonsiloxy chain terminating groups by reaction with a trihydrocarbonhalosilane in the presence of an amine hydrogen halide acceptor. This reaction can be represented by the following skeletal equation:

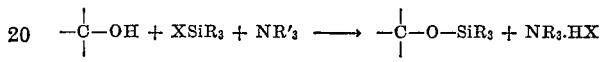

wherein R is a monovalent hydrocarbon group, R' is a monovalent hydrocarbon group or a hydrogen atom and X is a halogen atom. This reaction is conveniently conducted at temperatures from 0° C. to 50° C. The salt produced in the reaction (i.e. $NR_3.HX$) is insoluble in the reaction mixture and can be readily separated from the block copolymer by filtration. Solvents (e.g. benzene and toluene) can be used as a reaction medium. Suitable trihydrocarbonhalosilanes (i.e., $XSiR_3$) include trimethylchlorosilane, triethylchlorosilane, tripropylbromosilane and triphenylbromosilane. By this reaction, any hydroxyl chain terminating group in our block copolymers can be replaced by such trihydrocarbonsiloxy groups as the trimethylsiloxy, triethylsiloxy, tripropylsiloxy and triphenylsiloxy groups.

The following examples illustrate the present invention.

Examples 1 to 17 illustrate the preparations of crosslinked block copolymers of this invention.

EXAMPLE 1

Preparation of vinylethoxypolysiloxane

In a five-liter flask fitted with a dropping funnel, stirrer and condenser was placed 1454 grams (9.0 moles) of vinyltrichlorosilane. Over a period of 1 hour there were added 1100 grams (24 moles) of ethanol at room temperature. The reaction mixture was then heated with stirring to 90° C. over a period of 4.5 hours. The contents of the flask were cooled to 30° C., isopropyl ether (320 milliliters) added, and the dropwise addition of water (144 grams, 8 moles) made over a period of 1 hour. The reaction mixture was then heated at reflux for 3 hours. The resulting solution was cooled to room temperature, filtered, and the filtrates neutralized by addition of solid sodium bicarbonate. After filtration to remove solid salts, the ether solution was stripped at room temperature at a pressure of 24 millimeters of mercury absolute to remove the solvent. The resulting product, a clear, colorless oil, weighed 811 grams (88 percent yield based on theoretical) and had a viscosity of 58 centipoises. The ethoxy group to silicon ratio of this fluid was 0.65 indicating a 27 weight percent content of ethoxy groups as shown by analysis of Si and ethoxy groups.

EXAMPLE 2

Block copolymer from a vinylethoxypolysiloxane and a monomethyl ether of a polyoxyethylene glycol (av. M.W. 750)

In a one-liter flask connected to a fractionating column there were placed 50 grams of vinylethoxypolysiloxane (such as that prepared in Example 1) containing 27 percent ethoxy groups by weight (equivalent of 0.3 mole of ethoxy groups) and an average of 8 silicon units per molecule, 225 grams (0.3 mole) polyoxyethylene glycol monomethyl ether having an average molecular weight of 750, 250 cubic centimeters of xylene, and 0.5 gram of trifluoroacetic acid catalyst. The reaction mixture was heated at the atmospheric reflux temperature of about 145° C. for five hours during which time 13.5 grams of material, distilling at a temperature within the range from 70 to 80° C. and consisting primarily of ethyl alcohol, was removed from the head of the column. After removing the solvent under a reduced pressure of 9 millimeters of mercury, absolute, at a maximum temperature of 75° C. there was obtained 263 grams of a thick, water-soluble oil, representing the organo-silicone block copolymer, which behaved as an emulsifying agent for benzene-water mixtures. A further application of this copolymer was in the sizing of glass cloth by aqueous solutions of said copolymer.

EXAMPLE 3

Preparation of phenylethoxypolysiloxane

In a 100-gallon kettle there were placed 423 pounds (2 moles) of phenyltrichlorosilane. Eighty-three pounds (1.804 moles) of ethanol were added slowly with stirring at 30° C. After addition of isopropyl ether (56.8 pounds), the partial ester formed was then hydrolyzed by the addition of water (37.8 pounds, 2.098 moles). The resulting solution was heated at reflux for 2 hours to expel hydrogen chloride gas. Residual hydrogen chloride was then neutralized by addition of the required amount of sodium bicarbonate. The mixture was filtered, vacuum desolvated at 100° C. and 25 millimeters of mercury absolute and filtered again to obtain a clear, colorless product weighing 324.8 pounds and containing 25.2 weight percent residual ethoxy groups. The product had an average of eight silicon units per molecule as shown by cryoscopic molecular weight measurements in cyclohexane (molecular weight equals 1100 to 1400).

EXAMPLE 4

Block copolymer from a phenylethoxypolysiloxane and a monobutyl ether of a polyoxypropylene glycol (av. M.W. 1000)

In a one-liter flask connected to a fractionating column there were placed 35.5 grams of phenylethoxypolysiloxane (such as that prepared in Example 3) containing 25.3 percent ethoxy groups by weight (0.20 mole) an average of 8 silicon units per molecule, 200 grams (0.20 mole) of the monobutyl ether of polyoxy-1,2-propylene glycol having an average molecular weight of 1000, and 0.5 gram of potassium dimethyl silanolate catalyst (containing 3 percent potassium by weight). The mixture was heated under a reduced pressure at a temperature of about 200° C. until ethanol was no longer evolved. There was obtained 226 grams of a polymeric oil, representing the organo-silicone block copolymer, having a viscosity of 170.8 centistokes at 100° F. This copolymer had good metal-to-metal lubricating properties. For example, it carried a load of 1250 lb. in a standard Falex load test for steel-on-steel surfaces, whereas, under these same conditions, a dimethyl silicone oil of comparable viscosity carried less than a 100 lb. load.

EXAMPLE 5

Block copolymer from a phenylethoxypolyiloxane and a monobutyl ether of a polyoxypropylene glycol (av. M.W. 1000).

In a one-liter flask connected to a fractionating column there were placed 35.5 grams of phenylethoxypolysiloxane (such as that prepared in Example 3) containing 25.3 percent ethoxy groups by weight and an average of 8 silicon units per molecule, 200 grams (0.2 mole) of monobutyl ether of polyoxy-1,2-propylene glycol having an average molecular weight of 1000, 200 cubic centimeters of xylene and 0.5 gram of potassium dimethyl silanolate catalyst (containing 3 percent potassium by weight). The reaction mixture was heated at the atmospheric reflux temperature of about 145° C. for a period of several hours during which time 10 grams of material distilling at a temperature between 77° C. and 80° C. and consisting mainly of ethyl alcohol was removed from the head of the column. After removing the solvent from the reaction mixture under a reduced pressure, there was obtained 223 grams of a clear polymeric oil, representing the organo-silicone block copolymer, having a viscosity of 487 centistokes at 100° F. This material lubricated steel-on-steel surfaces and carried a load of 1250 pounds in the standard Falex test machine, whereas a dimethylsiloxane oil of comparable viscosity carried less than a 100 lb. load under the same conditions.

The crosslinked organo-silicone block copolymers of this invention and the novel processes for making them are further illustrated by Examples 6 through 8 herein. In these examples an alkoxy trifunctional hydrocarbyl siloxane is reacted with a polyoxyalkylene glycol in accordance with Equations A and B above, to produce copolymers having polysiloxane blocks crosslinked by polyoxyalkylene blocks. The molar ratios of polyoxyalkylene glycol to alkoxy groups in the siloxane polymer in the following examples are equal to 0.5.

EXAMPLE 6

Block copolymer from a phenylethoxypolysiloxane and a polyoxyethylene glycol (av. M.W. 550)

In a one-liter flask connected to a fractionating column there were placed 120 grams (0.22 mole) of polyoxyethylene glycol having an average molecular weight of 550, and 200 cubic centimeters of xylene. The solution was heated at the atmospheric reflux temperature of about 145° C. and any dissolved water present was removed from the head of the column. At this point, 35.5 grams of phenylethoxypolysiloxane containing 25.3 percent ethoxy groups by weight (0.20 mole) and an average of 8 silicon units per molecule and 1.5 grams of potassium dimethyl silanolate catalyst (containing 3.0 percent potassium by weight) were added to the reaction flask. The mixture was heated at the atmospheric reflux temperature (about 135° C.) for 5 hours during which time 13 grams of material distilling at a temperature within the range from 76° C. to 130° C. and consisting mainly of ethyl alcohol and a small amount of xylene were removed from the head of the column. The reaction mixture was stripped of solvent under reduced pressure and there was obtained approximately 140 grams of a gummy, solid product, representing the organo-silicone block copolymer, which was soluble in water and benzene and behaved as an emulsifying agent for benzene-water mixtures.

EXAMPLE 7

Block copolymer from a vinylethoxypolysiloxane and a polyoxyethylene glycol (av. M.W. 550)

In a one-liter flask connected to a fractionating column there were placed 90 grams (0.16 mole) of polyoxyethylene glycol, having an average molecular weight of about 550, and 200 cubic centimeters of xylene. This solution was heated at the atmospheric reflux temperature of about 145° C. and any water present was removed from the head of the column. At this point 50 grams of vinylethoxypolysiloxane (such as that prepared in Example 1) containing 27 percent ethoxy groups by weight (0.3 mole) and an average of 8 silicon units per molecule and 0.5 gram of trifluoroacetic acid catalyst were added. The reaction mixture was then heated at the atmospheric reflux temperature of about 145° C. for 4 hours during which time 4.6 grams of ethyl alcohol were removed at the head of the column. After removing the solvent at a temperature of 150° C. under an absolute pressure of 10 millimeters of mercury, absolute, there was obtained 125 grams of a thick, water-soluble oil, representing the organo-silicone block copolymer. This particular copolymer exhibited properties making it suitable as a glass cloth size.

EXAMPLE 8

Block copolymer from a vinylethoxypolysiloxane and a polyoxyethylene glycol (av. M.W. 1540)

In a one-liter flask connected to a fractionating column there were placed 50 grams of vinylethoxypolysiloxane (such as that prepared in Example 1) containing an average of 8 silicon atoms to the molecule and 27 percent ethoxy groups by weight (equivalent to 0.3 mole ethoxy groups), 230 grams (0.15 mole) of polyoxyethylene glycol having an average molecular weight of about 1540, 500 cubic centimeters of xylene and 1.5 grams of trifluoroacetic acid catalyst. The mixture was heated at the atomspheric reflux temperature of about 145° C. for 4 hours after which time ethanol ceased to collect at the head of the column. The solvent was removed at a temperature of 160° C., under a 100 millimeters of mercury absolute pressure. The resulting block copolymer, weighing 260 grams, was a hard, brittle, infusible solid which was insoluble in water and exhibited a highly crosslinked character. The block copolymer made herein can be used as an anti-static agent for textile fibers by causing its formation on such fibers.

Block copolymers were prepared in a manner similar to the preparation set forth in the foregoing examples using as the siloxane reactants alkoxy trifunctional hydrocarbyl polysiloxanes having silicon-attached hydrocarbyl groups of ethyl and methyl. The reactions of polyoxyalkylene mono-ols and diols with polysiloxanes of the latter type proceed in a similar manner without any apparent, different effect and resulted in products having corresponding properties. Similarly, polysiloxanes containing methoxy groups instead of ethoxy groups can be reacted with polyoxyalkylene mono-ols and diols and result in products of corresponding properties.

EXAMPLE 9

An oxyalkylene polymer having the average formula:

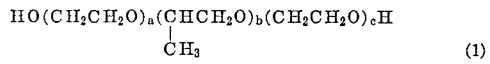

$$\text{HO}(CH_2CH_2O)_a(\underset{\underset{CH_3}{|}}{C}HCH_2O)_b(CH_2CH_2O)_cH \quad (1)$$

wherein $a$ and $c$ each have an average value of 9.2 and $b$ has an average value of 20.7 (139.7 grams, 0.070 mole) was dehydrated by forming a solution thereof with toluene (300 cc.) and then distilling a water-toluence azeotrope from the mixture. The dehydrated solution of oxyalkylene polymer was then cooled to 60° C. and was mixed with trifluoroacetic acid (0.5 gram) and with a siloxane polymer (35.3 grams, 0.0205 mole, 0.062 equivalent of $OC_2H_5$) having the average formula:

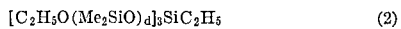

$$[C_2H_5O(Me_2SiO)_d]_3SiC_2H_5 \quad (2)$$

wherein $d$ has an average value of 6. An ethanol-toluene azeotrope was distilled and then sodium bicarbonate (1.9 grams, 0.023 mole) was added. The resulting mixture was heated for two hours and filtered. The filtrate was sparged with nitrogen and the residue was a pale yellow, water-soluble copolymer having the average formula:

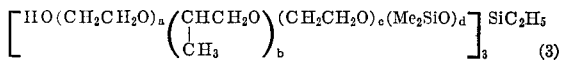

$$\left[\text{HO}(CH_2CH_2O)_a\left(\underset{\underset{CH_3}{|}}{C}HCH_2O\right)_b(CH_2CH_2O)_c(Me_2SiO)_d\right]_3 SiC_2H_5 \quad (3)$$

wherein $a$ and $c$ each have an average value 9.2, $b$ has an average value of 20.7 and $d$ has an average value of 6.

In accordance with the above procedure, the following block copolymers represented by Formula 3 were produced from oxyalkylene polymers represented by Formula 1 and siloxane polymers represented by Formula 2 wherein $a$, $b$, $c$ and $d$ have the indicated values:

| Run | Values of subscripts in formulae (1), (2) and (3) | | | |
|---|---|---|---|---|
| | a | b | c | d |
| 1 | 13.3 | 30.2 | 13.3 | 6 |
| 2 | 5.9 | 20.7 | 5.9 | 6 |
| 3 | 4.6 | 16.4 | 4.6 | 6 |
| 4 | 9.2 | 20.7 | 9.2 | 6 |
| 5 | 9.2 | 20.7 | 9.2 | 6 |
| 6 | 5.0 | 30.2 | 5.0 | 6 |
| 7 | 79.5 | 30.2 | 79.5 | 6 |
| 8 | 2.2 | 30.2 | 2.2 | 6 |

One mole of the starting siloxane per 3.3 moles of the starting oxyalkylene polymer were reacted in each run.

EXAMPLE 10

Following the procedure set forth in Example 9, 3.3 moles of an oxyalkylene polymer having the formula:

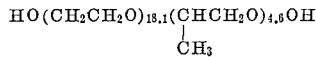

$$\text{HO}(CH_2CH_2O)_{18.1}(\underset{\underset{CH_3}{|}}{C}HCH_2O)_{4.6}OH$$

and 1.0 mole of a siloxane represented by Formula 2 wherein $d$ has an average value of 6 were reacted in the presence of 0.1 wt. percent, 2,6-di-tertiary-p-cresol as an antioxidant to produce a block copolymer having the formula:

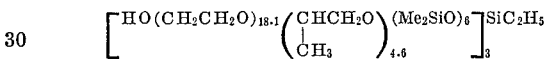

$$\left[\text{HO}(CH_2CH_2O)_{18.1}\left(\underset{\underset{CH_3}{|}}{C}HCH_2O\right)_{4.6}(Me_2SiO)_6\right]_3 SiC_2H_5$$

Such antioxidants can be used in producing our block copolymers but they are not essential in the process.

EXAMPLE 11

The procedure used in Example 10 was repeated except that the starting oxyalkylene polymer had the formula:

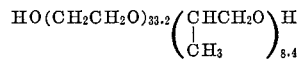

$$\text{HO}(CH_2CH_2O)_{33.2}\left(\underset{\underset{CH_3}{|}}{C}HCH_2O\right)_{8.4}H$$

The block copolymer so produced had the formula:

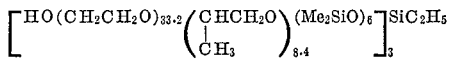

$$\left[\text{HO}(CH_2CH_2O)_{33.2}\left(\underset{\underset{CH_3}{|}}{C}HCH_2O\right)_{8.4}(Me_2SiO)_6\right]_3 SiC_2H_5$$

EXAMPLE 12

Following the procedure described in Example 9, 3.3 moles of an oxyalkylene polymer having the average formula:

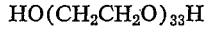

$$\text{HO}(CH_2CH_2O)_{33}H$$

was reacted with one mole of a siloxane polymer represented by Formula 2 wherein $d$ has an average value of 6. The block copolymer so produced had the formula:

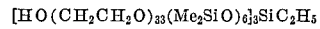

$$[\text{HO}(CH_2CH_2O)_{33}(Me_2SiO)_6]_3 SiC_2H_5$$

the block copolymer was reacted with trimethylchlorosilane in the presence of diethyl amine. A precipitate formed and was separated from the liquid produced by filtration. The liquid produced was a block copolymer having the formula:

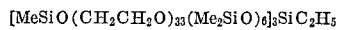

$$[MeSiO(CH_2CH_2O)_{33}(Me_2SiO)_6]_3 SiC_2H_5$$

EXAMPLE 13

Following the procedure described in Example 9, 3.3 moles of an oxyalkylene polymer having the average formula:

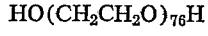

$$\text{HO}(CH_2CH_2O)_{76}H$$

was reacted with one mole of a siloxane polymer represented by Formula 2 wherein $d$ has an average value of 12.7. The block copolymer so produced had the formula:

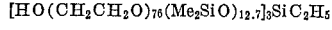

$$[\text{HO}(CH_2CH_2O)_{76}(Me_2SiO)_{12.7}]_3 SiC_2H_5$$

The block copolymer was reacted with trimethylchlorosilane in the presence of diethyl amine. A precipitate formed and was separated from the liquid produced by filtration.

The liquid produced was a block copolymer having the formula:

[Me₃SiO(CH₂CH₂O)₇₆(Me₂SiO)₁₂.₇]₃SiC₂H₅

EXAMPLE 14

Following the procedure described in Example 9, 3.3 moles of an oxyalkylene polymer having the formula:

$$HO\left(\begin{array}{c}CHCH_2O\\|\\CH_3\end{array}\right)_{35}H$$

were reacted with one mole of a siloxane represented by Formula 2 wherein $d$ is 6. The block copolymer so produced had the formula:

$$\left[HO\left(\begin{array}{c}CHCH_2O\\|\\CH_3\end{array}\right)_{35}(Me_2SiO)_6\right]_3SiC_2H_5$$

EXAMPLE 15

Following the procedure described in Example 9, 3.3 moles of an oxyalkylene polymer represented by Formula 1 wherein $a$ and $c$ each have an average value of 25.5 and $b$ has an average value of 38.7 was reacted with one mole of a siloxane having the formula:

[Me₂CHO(Me₂SiO)₆]₃SiMe to produce of block copolymer having the formula:

$$[HO(CH_2CH_2O)_{25.5}\left(\begin{array}{c}CHCH_2O\\|\\CH_3\end{array}\right)_{38.7}(CH_2CH_2O)_{25.5}(Me_2SiO)_6]_3SiMe$$

EXAMPLE 16

The procedure used in Example 15 was repeated except that the starting oxyalkylene polymer had the formula:

$$HO\left(\begin{array}{c}CHCH_2O\\|\\CH_3\end{array}\right)_{35}H$$

there was so produced a siloxane having the formula:

$$[HO\left(\begin{array}{c}CHCH_2O\\|\\CH_3\end{array}\right)_{35}(Me_2SiO)_6]_3SiMe$$

EXAMPLE 17

In accordance with the procedures described above, a block copolymer having the formula:

HO(CH₂CH₂O)₃SiMe₂(OSiMe₂)₆OSiMe₃ was produced by reacting an oxyalkylene polymer having the formula:

HO(CH₂CH₂O)₃H and a siloxane polymer having the formula:

C₂H₅OSiMe₂(OSiMe₂)₆OSiMe₃

The following physical properties of various copolymers prepared as described above were determined

| Copolymer produced in— | Properties of copolymers |
|---|---|
| Example 9 (run 5). | Viscous liquid, pale yellow, soluble in water. |
| Example 9 (run 7). | Solid, melting point 52° C., cloud point 88° C. (1 wt. percent in H₂O). |
| Example 12 (OH end-blocked copolymer). | Solid, melting point 44° C., soluble in water. |
| Example 12 (Me₃SiO end-blocked copolymer). | Solid, pale yellow, soluble in water. |
| Example 13 (OH end-blocked copolymer). | Waxy solid, while, slightly soluble in water, soluble in 75 wt.-percent aqueous ethanol. |
| Example 13 (Me₃SiO end-blocked copolymer). | Waxy solid, pale yellow, soluble in 75 wt. percent aqueous ethanol. |
| Example 15. | Viscous liquid. |

All of the copolymers prepared as described in Examples 9 to 15 were soluble in toluene.

Examples 18 to 36 illustrate the production of linear block copolymers of this invention.

EXAMPLE 18

Block copolymer from a dialkoxy polydimethylsiloxane (av. M.W. 1036) and a polyoxyethylene glycol (av. M.W. 500)

Fifty grams or 0.1 mole of polyoxyethylene glycol having an average molecular weight of 500 was dissolved in 200 milliliters of xylene and charged to a 500 milliliter flask with 103.6 grams or 0.1 mole of diethoxy-end-blocked polydimethylsiloxane having an average molecular weight of 1036 and 1.5 grams of trifluoroacetic acid catalyst. A fractionating column was attached to the flask and the charge was heated to its reflux temperature of about 120° C. to 140° C. an atmospheric pressure. Refluxing at this temperature and atmospheric pressure was continued for a period of 4 hours during which time 8.6 grams of material found to be ethanol boiling at a temperature of 78° C. to 80° C. was removed at the head of the column. When the temperature at the head of the column reached 140° C., a reduced pressure was applied and the contents of the flask were stripped of xylene and by-products leaving a viscous liquid product. The reduced viscosity of the product was determined to be 0.244 and it was found to contain 23.6 percent silicon by weight. By a theoretical calculation based on a complete reaction, the silicon content was 24.9 percent by weight.

EXAMPLE 19

Block copolymer from a dialkoxy polydimethylsiloxane (av. M.W. 1036) and a polyoxyethylene glycol (av. M.W. 500)

Three-hundred and eighty-four grams of polyoxyethylene glycol having an average molecular weight of 500 were dissolved in 500 milliliters of xylene and were charged to a 2 liter flask with a fractionating column having a Dean-Stark head. The charge was refluxed at a temperature of 140° C. at atmospheric pressure and about 0.3 milliliter of water was removed. The charge then was cooled and 320 grams of diethoxy-endblocked polydimethylsiloxane having an average molecular weight of 1036 and 4.5 grams of potassium silanolate containing 3 percent by weight of potassium were added. The reaction mixture was heated at its reflux temperature of about 120° C. to 140° C. at atmospheric pressure, 29.6 grams of alcoholic material was removed at the column head within the temperature range of 77° C. to 80° C. This alcoholic material was found to have a refractive index at 20° C. with sodium light of 1.3728 and was determined to contain 26.3 grams of ethanol as compared with a 29.4 gram theoretical yield based on a complete reaction. The contents of the flask were stripped of solvent and by-products under a reduced pressure and at a temperature of 200° C. yielding a soft waxy product. An elemental analysis of the product showed that it contained 15.7 percent by weight silicon as compared with the theoretical calculation based on a complete reaction of 16.3 percent silicon by weight.

EXAMPLE 20

Block copolymer from a dialkoxy polydimethyl-siloxane (av. M.W. 2220) and a polyoxyalkylene glycol (av. M.W.)

Three hundred grams of polyoxyethylene glycol having an average molecular weight of 6000, 107.3 grams of diethoxy-endblocked polydimethylsiloxane having an average of 28 dimethylsiloxy units, $$\begin{array}{c}CH_3\\|\\-Si-O-\\|\\CH_3\end{array}$$

per molecule and an average molecular weight of 2146, 107.3 grams of dimethylsiloxane cyclic tetramer, 4.0 grams of potassium dimethyl silanolate catalyst containing 3 percent by weight of potassium and 464 grams of xylene were added to a 2 liter flask with a fractionating column attached. The contents of the flask formed a two-layer liquid system which persisted after heating to 145° C. to 150° C. Additional xylene in the amount of 250 milliliters was added and reflux at a temperature of 140° C. at atmospheric pressure was achieved and maintained for a period of one hour. During this time 4.4 grams of low-boiling material boiling at a temperature of 78° C. to 80° C. and analyzed as ethanol were removed at the head of the column. A theoretical calculation based on a complete reaction indicated that 4.6 grams of ethanol be produced. The contents of the flask were stripped of solvent and by-products resulting in 335 grams of a hard waxy product, having an experimentally determined silicon content of 9.4 percent by weight. A theoretical calculation of silicon content indicated 9.6 percent silicon by weight. This example illustrates the method for controlling any alkaline catalyst-caused degradation which may occur during the reaction of the dimethylsiloxane chain.

EXAMPLE 21

Block copolymers from a dialkoxy polydimethyl-siloxane (av. M.W. 1036) and a polyoxyethylene glycol (av. M.W. 550)

In a 250 cubic centimeter flask connected to a fractionating column there were placed 15 grams of polyoxyethylene glycol having an average molecular weight of 550, 20 grams of diethoxy-endblocked polydimethylsiloxane having an average molecular weight of 1036, 0.35 gram of potassium dimethylsilanolate catalyst (containing 3 percent by weight of potassium), and 50 cubic centimeters of xylene. The molar ratio of glycol to polysiloxane used herein was equal to about 1.41. The above reactants were heated at the reflux temperature (140° C.) at atmospheric pressure for 3 hours during which time a small amount of material containing ethyl alcohol was removed from the head of the column. About 0.60 gram of n-amyl borate was then added to neutralize the potassium silanolate catalyst and the reaction mixture heated at the reflux temperature for an additional hour. Removal of the toluene solvent by distillation resulted in 29.5 grams of a viscous oily product. On standing the copolymer converted to a soft wax which had good emulsifying properties. An elemental chemical analysis performed on the product of this example is shown below along with a theoretical analysis based on the ratio of reactants:

|  | Found, wt. percent | Theory, wt. percent |
|---|---|---|
| Carbon | 43.8 | 42.1 |
| Hydrogen | 9.2 | 8.6 |
| Silicon | 18.7 | 21.3 |
| Oxygen (by difference) | 28.3 | 28.0 |
| Total | 100.0 | 100.00 |

EXAMPLE 22

Block copolymer from a dialkoxy dimethylpolysiloxane (av. M.W. 1036) and a polyoxyethylene glycol (av. M.W. 1540)

In a two-liter flask connected to a fractionating column there were placed 145 grams of polyoxyethylene glycol having an average molecular weight of 1540, 103.6 grams of diethoxy-endblocked polydimethylsiloxane having an average molecular weight of 1036, 1.30 grams of perfluorobutyric acid and 750 cubic centimeters of xylene. The molar ratio of glycol to polysiloxane used herein was equal to about 0.94. The mixture was heated at the reflux temperature (about 140° C.) under atmospheric pressure for 16 hours, during which time material containing ethyl alcohol and distilling below the boiling point of xylene was removed from the head of the column. After removal of the solvent by distillation under reduced pressure there was obtained 235 grams of a hard, water-soluble, wax-like product having a reduced viscosity of 0.301.

EXAMPLE 23

Block copolymer from a dialkoxy polydimethylsiloxane (av. M.W. 1036) and a polyoxyethylene glycol (av. M.W. 3700)

In a one-liter flask there were placed 112.5 grams of polyoxyethylene glycol having an average molecular weight of 3700, 51.8 grams of diethoxy-endblocked polydimethylsiloxane having an average molecular weight of 1036, 0.25 gram of perfluorobutyric acid catalyst and 500 cubic centimeters of xylene. The number of moles of glycol per mole of polysiloxane used herein was equal to approximately 0.61. The mixture was heated at the reflux temperature (about 140° C.) under atmospheric pressure for 5 hours during which time a low-boiling material identified as ethyl alcohol was removed along with some solvent from the head of the column. The flask was then kept at 145° C.–150° C. in a constant temperature bath for 16 hours. Upon removal of the xylene solvent under reduced pressure there was obtained 150 grams of a water-soluble, brittle wax-like product having a reduced specific viscosity of 0.11.

EXAMPLE 24

Block copolymer from a dialkoxy polydimethylsiloxane (av. M.W. 1036) and a polyoxyethylene glycol (av. M.W. 6000)

In a one-liter flask connected to a fractionating column there were placed 120 grams of polyoxyethylene glycol having an average molecular weight of 6000, 20.7 grams of diethoxy-endblocked polydimethylsiloxane having an average molecular weight of 1036, 0.15 gram of trifluoroacetic acid catalyst and 600 cubic centimeters of xylene. The molar ratio of glycol to polysiloxane in this example was equal to 1. The mixture was heated at the reflux temperature (about 145° C.) under atmospheric pressure for 16 hours, during which time a clear solution was obtained, and low-boiling material containing alcohol was removed from the head of the column. After distilling off the xylene solvent under reduced pressure there was obtained a tough, horny, solid product having a reduced specific viscosity of 0.544.

EXAMPLE 25

Block copolymer from a dialkoxy polydimethylsiloxane (av. M.W. 16,500) and a polyoxyethylene glycol (av. M.W. 6000)

In a two-liter flask there were placed 120 grams of polyoxyethylene glycol having an average molecular weight of 6000, 165 grams of diethoxy-endblocked polydimethylsiloxane having an average molecular weight of 16,500, 0.3 gram of trifluoroacetic acid catalyst and 1250 cubic centimeters of xylene. The ratio of moles of polyoxyethylene glycol per mole of polysiloxane used in this example was equal to 2. The mixture was heated at the reflux temperature of about 145° C. under atmospheric pressure for 16 hours while slowly removing a mixture of solvent and a material identified as ethyl alcohol at the head of the column. Upon stripping the xylene solvent under reduced pressure there was obtained 270 grams of a gummy, water-insoluble solid having a reduced specific viscosity of 0.389 and representing the product.

EXAMPLE 26

Block copolymer from a dialkoxy polydimethylsiloxane (av. M.W. 75,000) and a polyoxyethylene glycol (av. M.W. 6000)

In a one-liter flask there were placed 6 grams of polyoxyethylene glycol having an average molecular weight of 6000, 75 grams of diethoxy-endblocked dimethylpolysiloxane having an average molecular weight of 75,000, 0.1 gram of trifluoroacetic acid catalyst and 500 cubic centimeters of xylene. The molar ratio of glycol to polysiloxane used herein being equal to 1. The mixture was heated at the reflux temperature of about 145° C. under atmospheric pressure for 20 hours, during which time a low-boiling material produced by the reaction and identified as ethyl alcohol containing some solvent were slowly removed at the head of the column. Upon removal of the xylene solvent under reduced pressure there was obtained 8.0 grams of a thick milky syrup as product.

The following example typifies the two-step, alternate method illustrated by Equations IV and V for producing our linear block copolymers of this invention.

EXAMPLE 27

Block copolymer comprising polyoxyethylene blocks and polydimethylsiloxane blocks In a 500 cubic-centimeter flask connected to a fractionating column, there were placed 120 grams of polyoxyethylene glycol having an average molecular weight of 550, 35.5 grams of diethoxy-dimethylsilane, 1.0 gram of potassium dimethyl silanolate catalyst containing about 3 percent by weight of potassium and 200 cubic centimeters of xylene solvent. The mixture was heated at the reflux temperature of about 145° C. under atmospheric pressure for 12 hours during which time 23 grams of low-boiling material comprising mainly ethyl alcohol was removed from the head of the column. Removal of the solvent from the reaction mixture under a reduced pressure resulted in 133 grams of a soft wax-like polymeric product containing about 3.4 percent by weight of silicon.

A mixture of 25.2 grams of the polymeric product produced above, 14.8 grams of dimethylsiloxane cyclic tetramer, 0.5 gram of potassium silanolate catalyst and 50 grams of xylene solvent were placed in a 250 cubic centimeter flask and heated at 150° C. for 3 hours. After heating 0.25 gram of n-amyl borate was added to neutralize the catalyst. Upon cooling the reaction mixture to room temperature, centrifuging the solution to remove suspended solids, and stripping the solvent under reduced pressure there was obtained 32 grams of a soft waxy product containing 12.7 percent by weight of silicon.

Block copolymers from polyoxy-1,2-propylene glycols and dialkoxy polydihydrocarbylsiloxane Polyoxy-1,2-propylene glycols which can be used in producing our block copolymers are polymeric compositions comprising long chain, polyoxypropylene molecules formed of at least five repeating oxy-1,2-propylene groups, —$CH_3C_2H_3O$—, with a hydroxyl group attached to each end of each molecule. These glycols may be prepared by the addition reaction of 1,2-propylene oxide to water, 1,2-propylene glycol or the lower polymers of 1,2-propylene glycol and are normally produced as mixtures of polyoxy-1,2-propylene glycols of various molecular weights. The average molecular weights of polyoxy-1,2-propylene glycols useful in forming our block copolymers range from approximately 308 to 3000 higher as for the highly polymerized, long chain polyoxy-1,2-propylene glycols.

Linear copolymers prepared from polyoxy-1,2-propylene glycols and alkoxy-endblocked polysiloxanes in the manner taught by this invention are water-insoluble, viscous oils having lubricating qualities which lend them to uses as lubricants. Such block copolymers can also be dissolved in polyoxy-1,2-propylene glycols, or ethers and diethers thereof, and can be employed as hydraulic fluids or lubricants. These block copolymers can also be mixed with polysiloxanes and employed as lubricants therewith. The following typical examples illustrate methods of preparing several specific polydihydrocarbylsiloxane-polyoxy 1,2-propylene glycol copolymers.

EXAMPLE 28

Block copolymer from a dialkoxy polydimethylsiloxane (av. M.W. 2220) and a polyoxy-1,2-propylene glycol (av. M.W. 1025)

In a 200 cubic centimeter flask there were placed 10.25 grams of polyoxy-1,2-propylene glycol having an average molecular weight of 1025, 20.0 grams of dimethoxy-endblocked polydimethylsiloxane having an average molecular weight of 2220 and 100 cubic centimeters of xylene. The number of moles of polyoxy 1,2-propylene glycol per mole of polysiloxane was equal to about 0.9. No additional catalyst was needed since 0.09 gram of potassium dimethylsilanolate catalyst (containing 3.0 wt. percent potassium) was present in the siloxane polymer. The mixture was refluxed at a temperature of about 145° C. under atmospheric pressure for an hour and then the xylene solvent distilled off at atmospheric pressure. There was obtained 28 grams of a clear light oil.

EXAMPLE 29

Block copolymer from a dialkoxy polydimethylsiloxane (av. M.W. 2220) and polyoxy-1,2-propylene glycol (av. M.W. 2400)

In a one-liter flask connected to a fractionating column there were placed 100 grams of polyoxy-1,2-propylene glycol having an average molecular weight of 2025, 92.5 grams of dimethoxy-endblocked polydimethylsiloxane having an average molecular weight of 2220, 1 gram of potassium dimethylsilanolate catalyst (containing 3 percent by weight of potassium), and 400 cubic centimeters of xylene. The molar ratio of polyoxy 1,2-propylene glycol to polysiloxane used in this example was about 1.2. The mixture was heated at the reflux temperature of about 145° C. under atmospheric pressure for 3 hours during which time a low-boiling material identified as ethyl alcohol was removed from the head or the column along with some solvent. At this point, 0.2 gram of n-amyl borate was added to neutralize the catalyst. Upon removal of the solvent under a reduced pressure there was obtained 135 grams of clear, viscous oily product having a viscosity of 747 cs. at 100° F. and a reduced specific viscosity of 0.21.

Block copolymers from polyoxyethylene-polyoxy-1,2-propylene glycols and dialkoxy polydimethylsiloxanes Polyoxyethylene-polyoxy-1,2-propylene glycols which can be used in producing our block copolymers are polymeric compositions comprising long chain molecules formed of a total of at least five oxyethylene units and oxy-1,2-propylene units with terminal hydroxyl groups. These glycols may be prepared by reacting ethylene oxide and 1,2-propylene oxide sequentially or concurrently with water, an aliphatic dihydroxy alcohol, e.g., ethylene glycol or 1,2-propylene glycol, or lower polymers of ethylene glycol, 1,2-propylene glycol or ethylene-1,2-propylene glycols. The average molecular weights of polyoxyethylene-polyoxy-1,2-propylene glycols which are particularly useful in forming our block copolymers range from 250 to 20,000 and higher.

The linear block copolymers having polydihydrocarbon siloxane blocks and polyoxyethylene-polyoxy-1,2-propylene blocks range in physical properties from viscous oils to gummy solids and from water-insoluble products to water-soluble products. Moreover, such block copolymers can be obtained with specific physical properties, as desired, by the selection of starting materials and molar ratios in which the starting materials are used. For example, block copolymers in which the polyoxyalkylene blocks are derived from water-insoluble polyoxyalkylene glycols are water-insoluble. Also, we have found that, block copolymers which individually have at least 50 percent by weight of their composition which is attributable to the oxyethylene groups are water-soluble.

The following table, Table III, illustrates the effect found to be exerted on the water-solubility of polyoxyethylene-polyoxy-1,2-propylene-polysiloxane by the relative weight fractions attributable to oxyethylene units, oxypropylene units and siloxane units in the copolymer molecule. The linear block copolymers represented in this table were produced from diethoxy polydimethylsiloxanes and polyoxyalkylene glycols containing 75 percent by weight of oxyethylene groups and 25 percent by weight of oxy-1,2-propylene groups.

TABLE III

| Average molecular weight of diethoxy polydimethyl-siloxane | Average molecular weight of polyoxyalkylene glycol | Approximate weight percent of copolymer attributable to polyoxyethylene units | water solubility of product |
|---|---|---|---|
| 2,146 | 13,000 | 64.6 | Soluble. |
| 518 | 400 | 48.0 | Insoluble. |
| 16,000 | 4,560 | 27.3 | Do. |

Alcoholic solutions of the water-insoluble linear block copolymers formed of polyoxyethylene-polyoxy-1,2-propylene glycols and dialkoxy polydihydrocarbylsiloxanes are soluble in water. Such copolymers, in addition to the water-soluble types, are useful as mold release compounds, emulsifying agents and rubber plasticizers. The following specific examples serve to typify copolymeric products of this type and methods for obtaining them.

EXAMPLE 30

Block copolymer from a dialkoxy - polydimethylsiloxane (av. M.W. 518) and a polyoxyethylenepolyoxy-1,2-propylene glycol (av. M.W. 400)

In a 500 cubic centimeter flask there were placed 80.0 grams of polyoxyethylene-polyoxy-1,2-propylene glycol comprising about 75 percent by weight of ethylene oxide and 25 percent by weight of propylene oxide and having an average molecular weight of 400, 51.8 grams of diethoxy-endblocked polydimethylsiloxane having an average molecular weight of 518, 0.2 grams trifluoroacetic acid catalyst and 250 cubic centimeters of toluene. The moles of polyoxyethylene-polyoxy 1,2-propylene glycol per mole of diethoxy-endblocked polydimethylsiloxane equalled 2. The mixture was heated at the reflux temperature of about 120° C. for 4 hours during which time 13 grams of low-boiling material containing 8.9 grams of ethanol were removed at the head of the column. Removal of the toluene under reduced pressure gave 118 grams of a clear, colorless, water-insoluble oil.

EXAMPLE 31

Block copolymer from a dialkoxy-polydimethylsiloxane (av. M.W. 16000) and a ployoxyethylene-polyoxy-1,2-propylene glycol (av. M.W. 4560)

In a one-liter flask there were placed 36.5 grams of polyoxyethylene-polyoxy-1,2-propylene glycol comprising about 75 percent by weight of ethylene oxide and 25 percent by weight of propylene oxide and having an average molecular weight of 4560, 65 grams of diethoxy-endblocked polydimethylsiloxane having an average molecular weight of 16,000, 0.75 gram of trifluoroacetic acid catalyst and 500 cubic centimeters xylene. The molar ratio of polyoxyethylene-polyoxy-1,2-propylene glycol to ethoxy-endblocked polydimethylsiloxane used herein was equal to 2. The mixture was heated at the reflux temperature of about 145° C. for 5 hours during which time some solvent and a low-boiling material identified as ethyl alcohol were removed at the head of the column. After cooling the solution, anhydrous NH₃ was bubbled through the solution for two minutes to neutralize the catalyst. The xylene was stripped under reduced pressure and there was obtained 99 grams of a gummy, water-insoluble, solid, alcoholic solutions of which were completely miscible with water.

EXAMPLE 32

Block copolymer from a dialkoxy-polydimethylsiloxane (av. M.W. 2146) and a polyoxyethylene-polyoxy-1,2-propylene glycol (av. M.W. 13,000)

In a 500 cubic centimeter flask connected to a fractionating column there were placed 65 grams of polyoxyethylene-polyoxy-1,2-propylene glycol comprising 75 percent ethylene oxide by weight and 25 percent propylene oxide by weight and having an average molecular weight of 13,000, 10.7 grams diethoxy-endblocked polydimethylsiloxane having an average molecular weight of 2146, 0.7 gram of perfluoroacetic acid catalyst and 300 cubic centimeters of xylene. The molar ratio of polyoxyethylene-polyoxy-1,2-propylene glycol to diethoxy-endblocked polydimethylsiloxane in this reaction mixture amounted to approximately 1. The mixture was heated at the reflux temperature of about 145° C. for 6 hours during which time material distilling below the boiling point of xylene and containing ethanol was removed from the head of the column. Upon removal of the xylene solvent under reduced pressure, there was obtained a thick, water-soluble, polymeric oil.

EXAMPLE 33

Block copolymer from an ethylhydrogensiloxane polymer and a polyoxyethylene-polyoxy-1,2-propylene glycol (av. M.W. 1550)

In a 250 cubic centimeter flask equipped with a reflux condenser and a gas bubble trap for detecting gas evolution there were placed 28 grams of an ethylhydrogensiloxane polymer having a viscosity of 928 centistokes at 25° C., 42 grams of a polyoxyethylene glycol monoether containing 50 weight percent ethylene oxide and 50 weight percent propylene oxide and having an average molecular weight of 1550, 59 grams of toluene and 0.35 gram (0.5 weight percent) of piperidine catalyst. The ethylhydrogensiloxane was made by shaking 74 g. (0.25 mole) of ethylhydrogensiloxane cyclic tetramer and 0.57 g. (0.0035 mole) of hexamethyldisiloxane with 1.0 g. of conc. sulfuric acid for 16 hours at room temperature, washing the resulting polymeric product with dilute sodium bicarbonate solution and removing the low-boiling material present below 150° C. at a pressure of 1 millimeter of mercury absolute. The mixture was heated at a temperature of 120° C. to 123° C. for 10 hours during which time hydrogen gas was evolved. After the evolution of gas had ceased the copolymer was stripped of solvent and other low-boiling materials to a temperature of 100° C. at 1 millimeter of mercury absolute pressure. There was obtained 66 grams of a homogeneous, water-soluble, liquid product having a viscosity of 684 centistokes at 25° C.

Block copolymers from polyoxy-1,3-propylene glycols and dialkoxy-polydimethylsiloxane Polyoxy-1,3-propylene glycols vary from slightly water-soluble to water-insoluble, viscous liquids which can be produced in the usual manner by reacting 1,3-propylene oxide with water, or by polymerizing propanediol-1,3 or low molecular weight polymers of propanediol-1,3 in the presence of a hydrogen iodide aqueous solution. These glycols are characterized by long chain molecules comprised of recurring oxy-1,3-propylene units and terminated by two hydroxyl groups, one at each end.

Linear block copolymers prepared from polyoxy-1,3-propylene glycols and alkoxy-endblocked polysiloxanes are water-insoluble, viscous, oils having lubricating qualities and closely resemble corresponding copolymers prepared from polyoxy-1,2-propylene glycol and alkoxy-endblocked polysiloxanes. To illustrate the method of preparing these copolymers the following typical example is presented.

EXAMPLE 34

Block copolymer from a dialkoxy-polydimethylsiloxane (av. M.W. 1036) and a polyoxy-1,3-propylene glycol (av. M.W. 760)

In a 500 ml. flask connected to a fractionating column were introduced 50 grams (.06 mole) of polyoxy-1,3-propylene glycol having an average molecular weight of 760 (determined cryoscopically in benzene), 36.4 grams (.01 mole) of diethoxy-endblocked polydimethylsiloxane having an average molecular weight of 1036, 0.18 gram of trifluoroacetic acid catalyst and 150 ml. of toluene as a solvent. The molar ratio of glycol to polysiloxane in this case was 1.87. The resulting solution was heated at the reflux temperature of about 120° C. for 6 hours during which time low-boiling material, boiling between 78° C. and 80° C., was removed at the head of the column. Solid sodium bicarbonate was added to neutralize the catalyst and the mixture was heated to reflux temperature (about 120° C.), cooled to room temperature and filtered. Upon distilling the toluene solvent under reduced pressure there was obtained 81 grams of a dark brown, water-insoluble oil having a viscosity of 1445 centistokes at 25° C. and an average molecular weight of about 3000 as determined cryoscopically in benzene.

Block copolymer from polyoxy-1,3-butylene glycols and dialkoxy-polydimethylsiloxanes Polyoxy-1,3-butylene glycols are characterized by polymeric chain molecules comprised of recurring oxy-1,3-butylene units and terminated by two hydroxyl groups, one at each end. These glycols are normally water-insoluble viscous liquids, prepared by reacting 1,3-butylene oxide with water, an alcohol such as n-butyl alcohol; a diol, e.g. butanediol-1,3- or a low molecular weight polyoxy-1,3-butylene glycol.

Linear block copolymers obtained from the reaction of a polyoxy-1,3-butylene glycol and an alkoxy-endblocked polysiloxane are water-insoluble oils having practical applications as lubricants. The following example typifies the preparation of these copolymers.

EXAMPLE 35

Block copolymer from a dialkoxy-polydimethylsiloxane (av. M.W. 518) and a polyoxy-1,3-butylene glycol (av. M.W. 520)

Into a 250 ml. flask connected to a fractionating column there were placed 50 grams of polyoxy-1,3-butylene glycol having an average molecular weight of 520, as determined cryoscopically in cyclohexane, 45.6 grams of diethoxy-endblocked polydimethylsiloxane having an average molecular weight of 518, 0.2 gram of trifluoroacetic acid and 100 ml. of toluene solvent. The resulting mixture was heated at the reflux temperature of about 120° C. for a period of 4 hours, during which time low-boiling material, distilling between 78° C.–80° C., and containing ethanol was removed at the head of the column. Solid sodium bicarbonate was added to neutralize the catalyst, and the mixture was heated at the reflux temperature of about 120° C. for a period of 30 minutes, cooled to room temperature and filtered. Upon distilling off the toluene solvent under reduced pressure, there was obtained 82 grams of a homogeneous, water-insoluble oil having a viscosity of 51.7 centistokes and an average molecular weight of 1082, as determined cryoscopically in cyclohexane.

EXAMPLE 36

Block copolymer from diethoxy-polydimethylsiloxane (av. M.W. 1036) and a polyoxyethylenepolyoxy-1,2-propylene-glycerol triol (av. M.W. 2550)

In a two liter flask to which there was connected a fractionating column there were placed 450 grams of toluene and 170 g. (0.067 mole based on hydroxy end group analysis) of a polyoxyalkylene triol containing 50 weight percent of oxyethylene units and 50 weight percent of oxy-1,2-propylene units and having an average molecular weight of 2550. This polyoxyalkylene triol was prepared by the reaction of a mixture of ethylene oxide and propylene oxide with glycerol. The mixture was refluxed at atmospheric pressure to remove any absorbed water which was present. Then, 207.2 grams (0.2 moles) of a diethoxy-polydimethylsiloxane having an average molecular weight of 1036 and 0.75 gram of trifluoroacetic acid catalyst were added to the mixture. The resulting mixture was then heated at the reflux temperature (about 110° C.) for five hours during which time 9.1 grams (0.2 mole) of ethanol was removed from the column head along with some toluene. Solid sodium bicarbonate in an amount of 20 grams was added to neutralize the catalyst and the mixture was heated at the reflux temperature (about 110° C.) for 30 minutes. After this time the mixture was cooled and filtered. The toluene solvent was removed under reduced pressure leaving 330 grams of a clear, polymeric oil, representing the block copolymer. The block copolymer thus prepared had a viscosity of 34000 centipoises at 25° C.

Many other dialkoxy-endblocked polydihydrocarbylsiloxanes can be used in place of those employed in the foregoing examples to produce our linear block copolymers. For example, dialkoxy-endblocked polydihydrocarbylsiloxanes which contain any of the following siloxane units or combinations thereof can be employed:

Diethyl-siloxane units, —Si$(C_2H_5)_2$O—, methylethylsiloxane units, Si$(CH_3)(C_2H_5)$O—, dimethylsiloxane units, —Si$(CH_3)_2$O—, diphenylsiloxane units, —Si$(C_6H_5)_2$O— methylphenylsiloxane units, —Si$(CH_3)(C_6H_5)$O—, ethylphenylsiloxane units, —Si$(C_2H_5)(C_6H_5)$O—, and the like.

As used herein "Me" denotes the methyl group.

As used herein the term "mono-ol" denotes a monohydroxy alcohol (e.g. ethanol); the term "diol" denotes a dihydroxy alcohol (e.g. ethylene glycol); and the term "triol" denotes a trihydroxy alcohol (e.g. glycerol).

Various varieties of the block copolymers of this invention (e.g., those wherein the oxyalkylene blocks are produced from triol starters) are novel compositions regardless of the particular endblockers on the blocks. One variety of such block copolymers can be characterized as block copolymer compositions comprising at least one siloxane block and at least one oxyalkylene block, (I) the siloxane block (a) being a siloxane polymer composed of difunctional silicon atoms or both difunctional silicon atoms and at least one trifunctional silicon atom (each difunctional silicon atom being linked to two monovalent hydrocarbon groups and two oxygen atoms and each trifunctional silicon atom being linked to a hydrocarbon group and three oxygen atoms) that are joined through silicon-oxygen-silicon bonds and (b) being linked to the oxyalkylene block by a carbon-oxygen-silicon bond; and (II) the oxyalkylene block (a) being an oxyalkylene polymer having at least five oxyalkylene units and units derived from a triol by removal of the hydrogen atoms of the hydroxyl groups, said units being joined together by carbon-oxygen-carbon bonds, and (b) being bonded to said siloxane polymer through said carbon-oxygen-silicon bond.

What is claimed is:

1. An organosiloxane-oxyalkylene block copolymer composition comprising at least one siloxane block and at least one oxyalkylene block, (I) the siloxane blocks (a) being a siloxane polymer composed of difunctional silicon atoms or both difunctional silicon atoms and at least one trifunctional silicon atom (each difunctional silicon atom being linked to two monovalent hydrocarbon groups and two oxygen atoms and each trifunctional silicon atom being linked to a hydrocarbon group and three oxygen atoms) that are joined through silicon-oxygen-silicon bonds and (b) being linked to the oxyalkylene block by a carbon-oxygen-silicon bond; and (II) the oxyalkylene blocks (a) being an oxyalkylene polymer having at least five oxyalkylene units and units derived from a triol by removal of the hydrogen atoms of the hydroxyl groups, said units being joined together by carbon-oxygen-carbon bonds, and (b) being bonded to said siloxane polymer through said carbon-oxygen-silicon bond.

2. A mixture of block copolymers selected from the group consisting of:

(I) A block copolymer which is free of trifunctional silicon atoms and which is composed of at least one siloxane polymer and at least one oxyalkylene polymer, each such siloxane polymer (a) being a linear siloxane polymer composed of difunctional silicon atoms that are each linked to two monovalent hydrocarbon groups and that are joined through oxysilicon bonds and (b) being linked at one end to said oxyalkylene polymer and at the other end to a member selected from the group consisting of (1) another of said oxyalkylene polymers, (2) a trihydrocarbonsiloxy group and (3) an alkoxy group; and each such oxyalkylene block (a) being composed of at least five oxyalkylene units and units derived from a triol by removal of the hydrogen atoms of the hydroxyl groups, said units being joined to each other by oxycarbon bonds, (b) being bonded at one end to said siloxane polymer through a carbon-oxysilicon bond and the other ends to a group from the class consisting of (1) another of said siloxane blocks, (2) a hydroxyl group and (3) a trihydrocarbonsiloxy group and (II) A block copolymer which is composed of at least one siloxane polymer and at least one oxyalkylene polymer in combination, each such siloxane polymer being composed of at least one trifunctional silicon atom bonded to three oxygen atoms and a monovalent hydrocarbon group, and difunctional silicon atoms bonded to two oxygen atoms and to monovalent hydrocarbon groups each such siloxane polymer being joined to at least one oxyalkylene polymer through a carbon-oxy-silicon bond and each such siloxane polymer being endblocked by a member selected from the group consisting of (1) another of said oxyalkylene polymers, (2) a trihydrocarbonsiloxy group and (3) alkoxy group; and each such oxyalkylene polymer being composed of at least five oxyalkylene units and units derived from a triol by removal of the hydrogen atoms of the hydroxyl groups, said units being joined to each other by oxycarbon bonds, and each such oxyalkylene polymer being joined at one end to said siloxane polymer and at the other ends to a member selected from the group consisting of (1) another of said siloxane polymers by a carbon-oxy-silicon bond, (2) a hydroxy group and (3) a trihydrocarbonsiloxy group; and (III) A block copolymer which is composed of at least one siloxane polymer and at least one oxyalkylene polymer in combination, each such siloxane polymer being (1) composed only of trifunctional silicon atoms, each of which silicon atoms is bonded to one hydrocarbon group and bonded to three oxygen atoms that link the silicon atoms to form 1 to 3 other silicon atoms by silicon to oxygen to silicon bonds, and at least one of which silicon atoms is bonded to from 1 to 2 oxyalkylene polymers by a silicon to oxygen to carbon bond in each instance and (2) endblocked by a member selected from the group consisting of the trihydrocarbonsiloxy groups, alkoxy groups, and other of said oxyalkylene polymers; and each such oxyalkylene polymer being composed of at least five oxyalkylene units and units derived from a triol by removal of the hydrogen atoms of the hydroxyl groups, said units being joined to each other by oxycarbon bonds, and each such oxyalkylene polymer being joined at one end to said siloxane polymer and at the other ends to a member selected from the group consisting of another of said siloxane polymers by a carbon-oxysilicon bond, the hydroxyl group, the trihydrocarbonsiloxy groups and alkoxy group carbon group through an oxygen atom.

3. A mixture of block copolymers as defined in part I of claim 2.

4. A mixture of block copolymers as defined in part II of claim 2.

5. A mixture of block copolymers as defined in part III of claim 2.

6. A mixture of block copolymers as defined in claim 2 wherein each oxyalkylene block is bonded at one end to a siloxane polymer.

7. A mixture of block copolymers as defined in claim 3 wherein each oxyalkylene block is bonded at one end to a siloxane polymer.

8. A mixture of block copolymers as defined in claim 4 wherein each oxyalkylene block is bonded at one end to a siloxane polymer.

References Cited

UNITED STATES PATENTS

| | | | |
|---|---|---|---|
| 2,834,748 | 5/1958 | Bailey et al. | 260—448.8 R X |
| 2,909,549 | 10/1959 | Bailey | 260—448.8 R |
| 2,917,480 | 12/1959 | Bailey et al. | 260—448.8 R X |
| 3,480,583 | 11/1969 | Bailey et al. | 260—448.8 R X |

TOBIAS E. LEVOW, Primary Examiner

P. F. SHAVER, Assistant Examiner

U.S. Cl. X.R.

252—49.6, 78, 351; 260—46.5 R, 824 R, 825